(12) United States Patent
Zhou

(10) Patent No.: US 8,464,671 B2
(45) Date of Patent: Jun. 18, 2013

(54) HORIZONTALLY OPPOSED CENTER FIRED ENGINE

(76) Inventor: Bo Zhou, Columbia, MO (US)

( * ) Notice: Subject to any disclaimer, the term of this patent is extended or adjusted under 35 U.S.C. 154(b) by 189 days.

(21) Appl. No.: 13/204,484

(22) Filed: Aug. 5, 2011

(65) Prior Publication Data

US 2012/0031379 A1 Feb. 9, 2012

Related U.S. Application Data

(60) Provisional application No. 61/372,032, filed on Aug. 9, 2010.

(51) Int. Cl.
*F02B 75/18* (2006.01)
*F02B 75/24* (2006.01)
*F02B 75/22* (2006.01)
*F02B 75/20* (2006.01)
*F02B 75/32* (2006.01)
*F02B 41/04* (2006.01)
*F16C 7/00* (2006.01)

(52) U.S. Cl.
USPC ...... 123/51 R; 123/52.1; 123/52.2; 123/52.3; 123/52.4; 123/52.5; 123/52.6; 123/53.1; 123/53.2; 123/53.3; 123/53.4; 123/53.5; 123/53.6; 123/54.1; 123/54.2; 123/54.3; 123/54.4; 123/54.5; 123/54.6; 123/54.7; 123/54.8; 123/55.1; 123/55.2; 123/55.3; 123/55.4; 123/55.5; 123/55.6; 123/55.7; 123/56.1; 123/56.2; 123/56.3; 123/56.4; 123/56.5; 123/56.6; 123/56.7; 123/56.8; 123/56.9; 123/57.1; 123/58.1; 123/58.2; 123/58.3; 123/58.4; 123/58.5; 123/58.6; 123/58.7; 123/58.8; 123/58.9; 123/59.1; 123/59.2; 123/59.3; 123/59.4; 123/59.5; 123/59.6; 123/59.7; 123/60.1; 123/197.1; 123/197.2; 123/197.3; 123/197.4; 123/197.5

(58) Field of Classification Search
USPC ............ 123/52, 52.1–60.1, 197, 197.1–197.5
See application file for complete search history.

(56) References Cited

U.S. PATENT DOCUMENTS

| | | | | | |
|---|---|---|---|---|---|
| 1,698,920 | A | * | 1/1929 | Mohatt et al. | 123/53.3 |
| 2,370,902 | A | * | 3/1945 | Workman | 123/55.2 |
| 4,381,903 | A | * | 5/1983 | Atkins | 417/254 |
| 4,554,894 | A | * | 11/1985 | Johnson | 123/51 AA |
| 4,850,313 | A | * | 7/1989 | Gibbons | 123/54.2 |
| 5,228,416 | A | * | 7/1993 | Puzio | 123/55.5 |
| 5,402,755 | A | * | 4/1995 | Waissi | 123/55.3 |
| 5,727,513 | A | * | 3/1998 | Fischer | 123/197.4 |
| 5,782,213 | A | * | 7/1998 | Pedersen | 123/55.2 |
| 5,983,845 | A | * | 11/1999 | Yanagisawa | 123/53.1 |
| 5,992,356 | A | * | 11/1999 | Howell-Smith | 123/55.3 |

(Continued)

*Primary Examiner* — Lindsay Low
*Assistant Examiner* — Charles Brauch
(74) *Attorney, Agent, or Firm* — Sinorica, LLC

(57) ABSTRACT

The horizontally opposed center fired engine improves on the traditional design of the horizontally opposed engines and center fired engines with a better engine geometry. The present invention utilizes four pairs of opposing pistons to compress a larger volume of air-fuel mixture within four different cylinders. The four different cylinders are radially positioned around a center axle in order to achieve a perfectly symmetric engine geometry. The center axle consists of two different shafts spinning in two different directions, which could drastically reduce engine vibrations in the present invention. Engine vibrations are caused by a change in engine speed and result in a loss of energy. Due to the design, the present invention will only experience energy loss in the form of entropy and friction. Thus, the present invention can convert a higher percentage of chemical energy into mechanical energy than any other internal combustion engine.

20 Claims, 16 Drawing Sheets

U.S. PATENT DOCUMENTS

| | | | |
|---|---|---|---|
| 6,073,595 A * | 6/2000 | Brogdon | 123/55.5 |
| 6,213,064 B1 * | 4/2001 | Geung | 123/54.1 |
| 6,279,519 B1 * | 8/2001 | Nagel et al. | 123/55.5 |
| 6,532,916 B2 * | 3/2003 | Kerrebrock | 123/46 E |
| 7,104,227 B2 * | 9/2006 | Roberts | 123/55.7 |
| 7,124,719 B2 * | 10/2006 | Ariyakunakorn | 123/80 D |
| 7,210,446 B2 * | 5/2007 | Sic et al. | 123/197.4 |
| 7,334,558 B2 * | 2/2008 | Higgins | 123/197.4 |
| 2004/0255879 A1 * | 12/2004 | Zaytsev | 123/55.2 |
| 2004/0255880 A1 * | 12/2004 | Kim et al. | 123/55.5 |
| 2006/0130782 A1 * | 6/2006 | Boland | 123/55.2 |
| 2007/0068468 A1 * | 3/2007 | Irick et al. | 123/55.5 |

* cited by examiner

HORIZONTALLY OPPOSED CENTER FIRED ENGINE

The current application claims a priority to the U.S. Provisional Patent application Ser. No. 61/372,032 filed on Aug. 9, 2010.

FIELD OF THE INVENTION

The present invention relates generally to an engine, more specifically, to a center fired engine with an improved engine geometry.

BACKGROUND OF THE INVENTION

Traditionally, design limitations hinder the performance of an internal combustion engine. In particular, low power density and asymmetric engine geometry are major drawbacks that prevent traditional engine designs from reaching higher engine efficiency. To achieve a better engine geometry, manufacturers have designed various V-shaped engines, which position its pistons at an acute angle. Manufactures have even designed a boxer engine, which positions its pistons at 180 degrees from each other, in order to achieve a better engine geometry. To achieve a larger power density, manufacturers such as EcoMotors are currently experimenting with an opposed piston opposed cylinder engine (OPOC) engine. The design limitations of the V-shaped engine and the boxer engine are that they only allow for one crankshaft in their engine design, which prevents opposing pistons from being aligned in a straight line. Thus, an engine design with one crankshaft produces an asymmetric, unbalanced configuration of pistons. In addition to having only one crankshaft, the design limitations of the OPOC engine include long connecting rods and complicated piston configurations. The present invention is a horizontally opposed center fired engine that has almost perfect engine geometry and increases power density, engine RPM, and possibly supports variable compression ratio. The present invention utilizes many existing engine parts with little to no modifications so that manufactures do not need to design new engine parts to assemble the present invention.

DETAIL DESCRIPTIONS OF THE INVENTION

Figure 1:
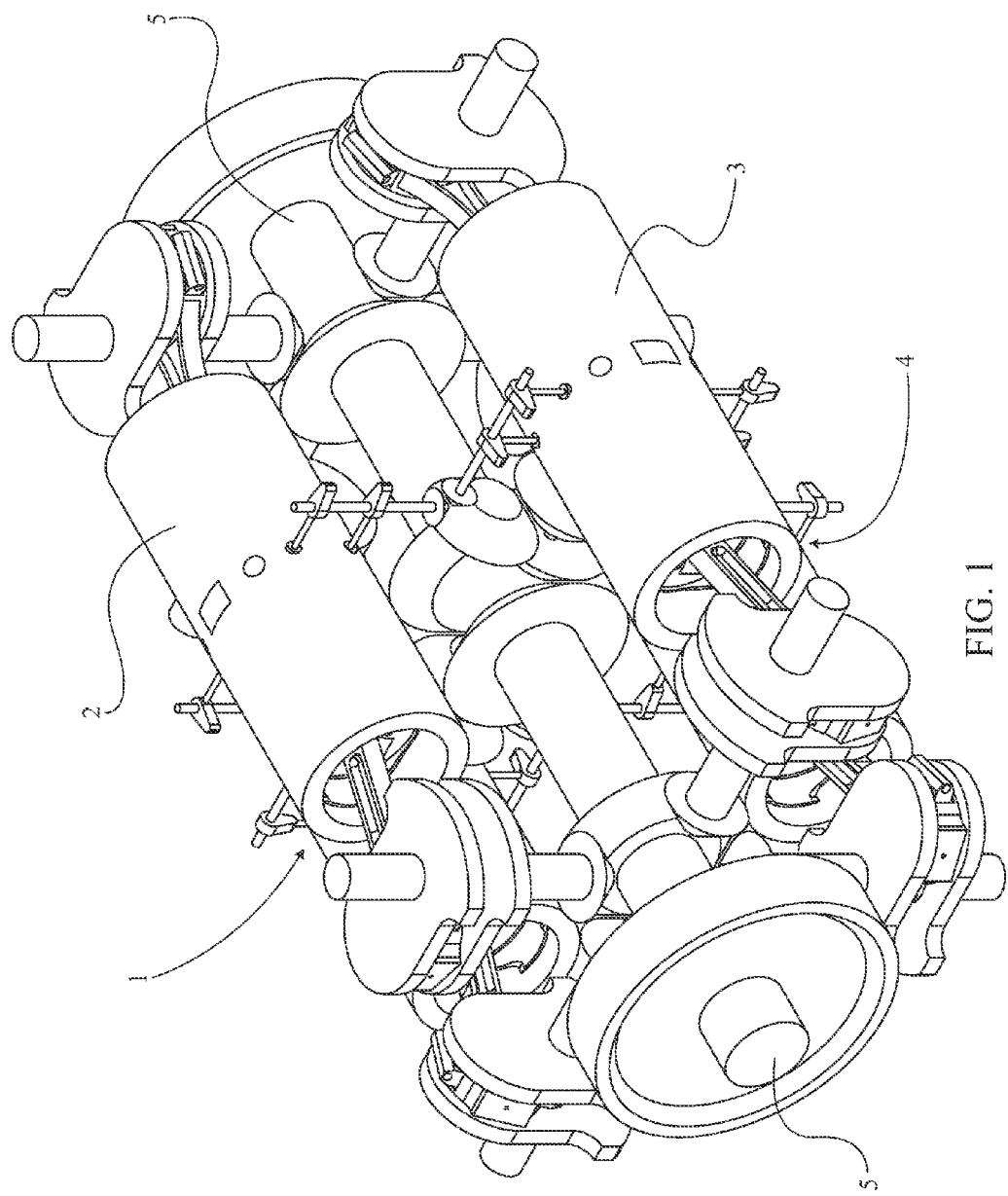
FIG. 1 is a perspective view of the present invention.
Figure 2:
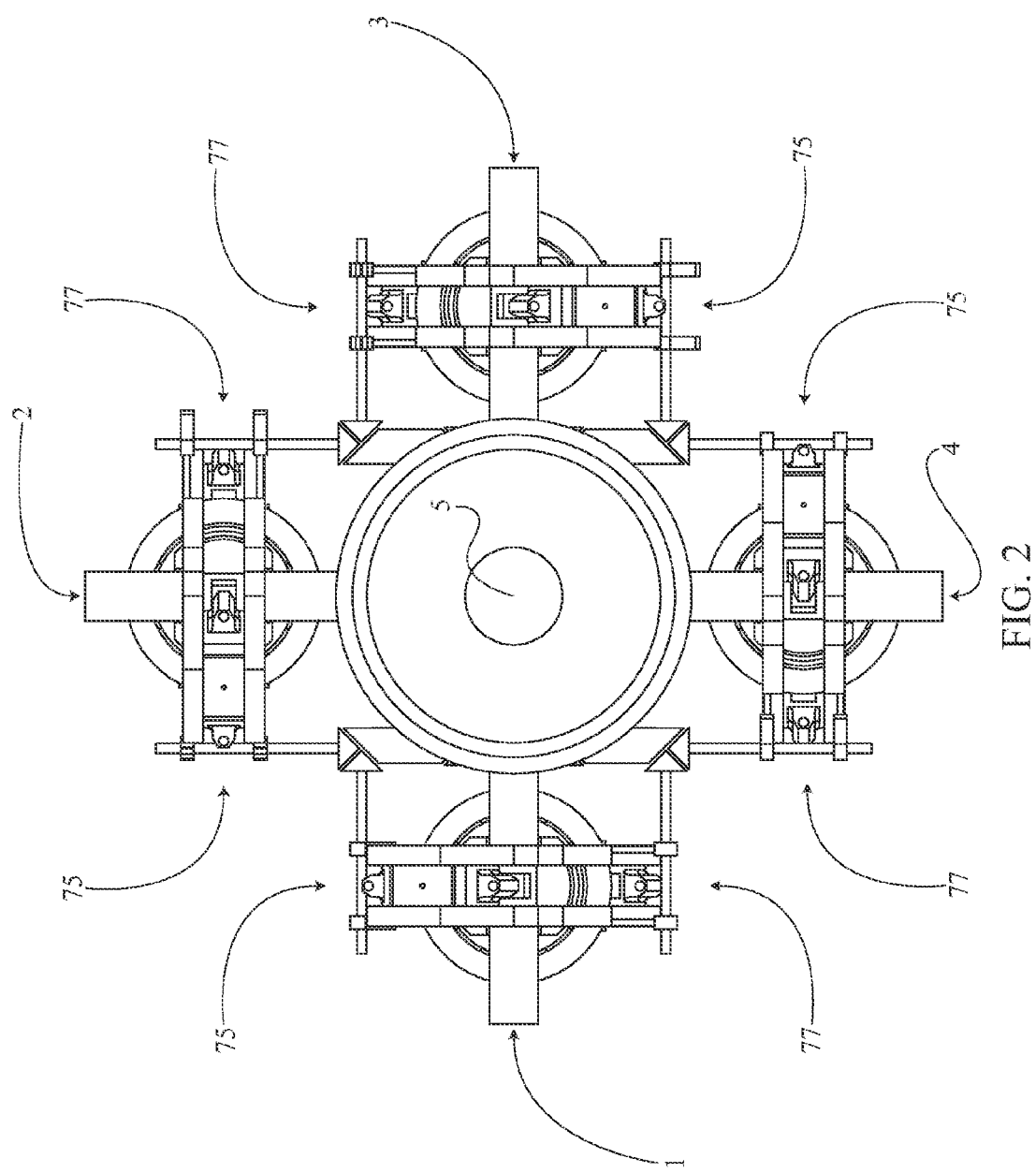
FIG. 2 is a front view of the present invention highlighting the orientation of each intake mechanism and the orientation of each exhaust mechanism.
Figure 3:
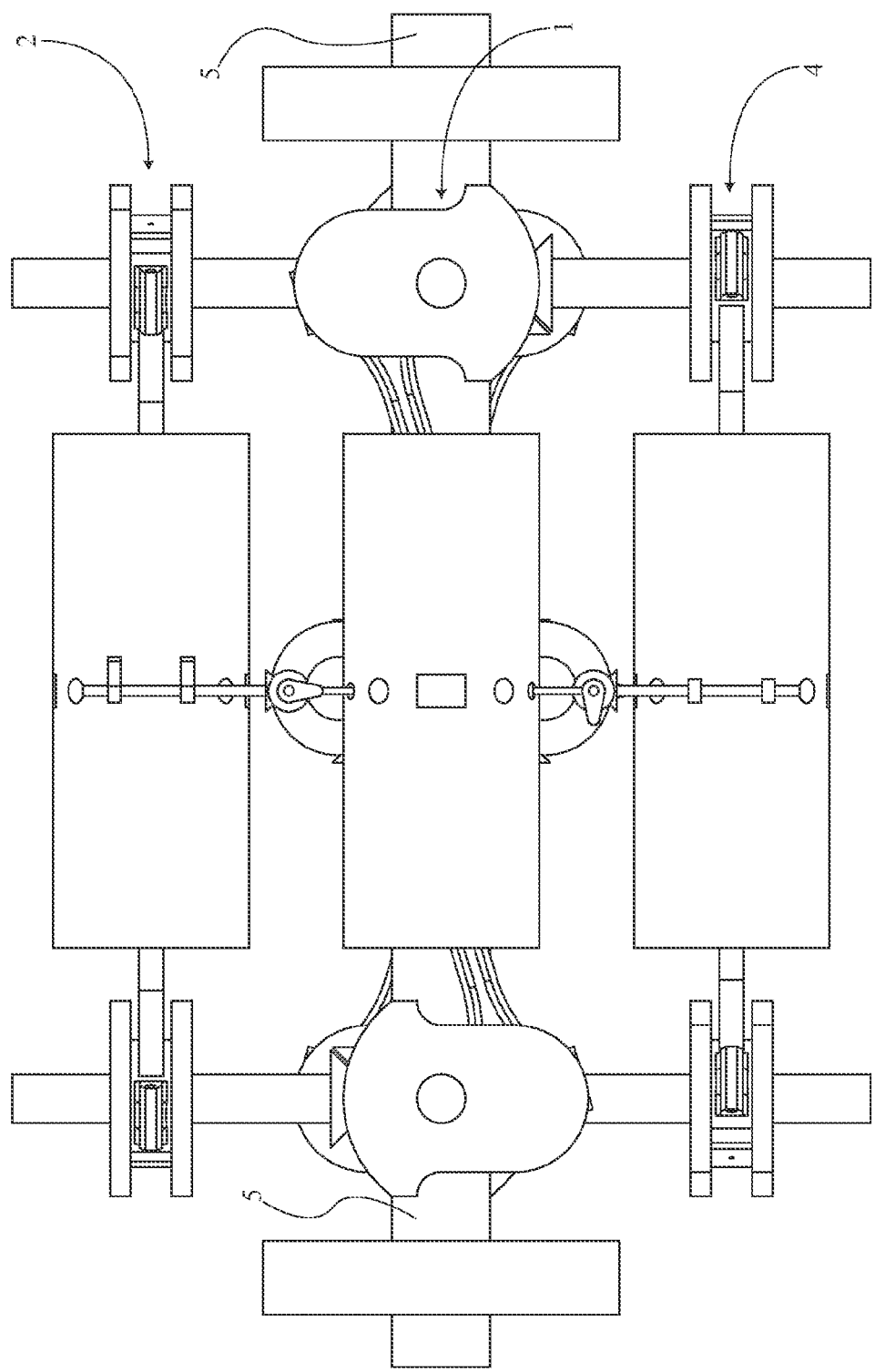
FIG. 3 is a left side view of the present invention.
Figure 4:
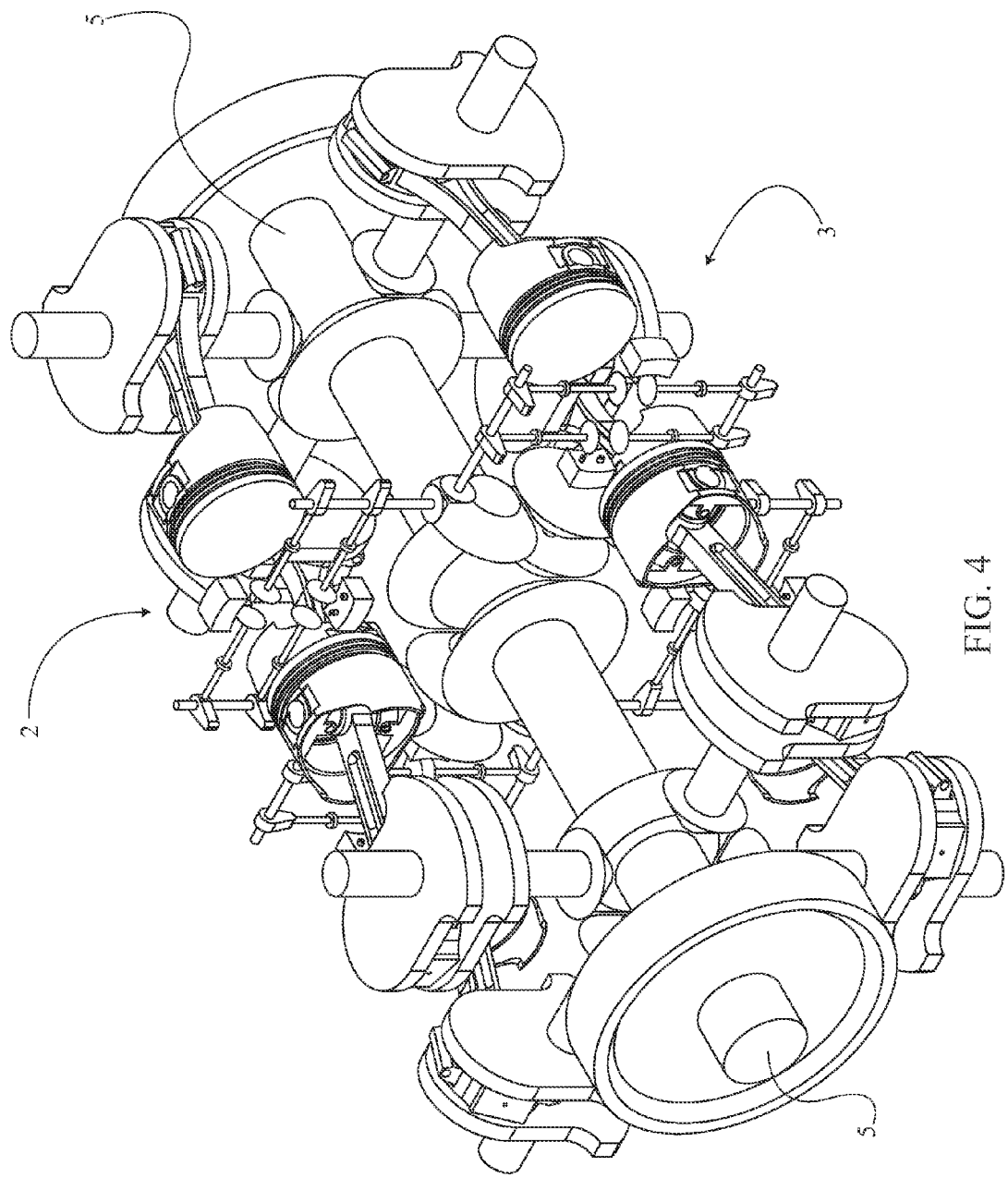
FIG. 4 is a perspective view of the present invention without the cylinders of the internal combustion mechanisms.
Figure 5:
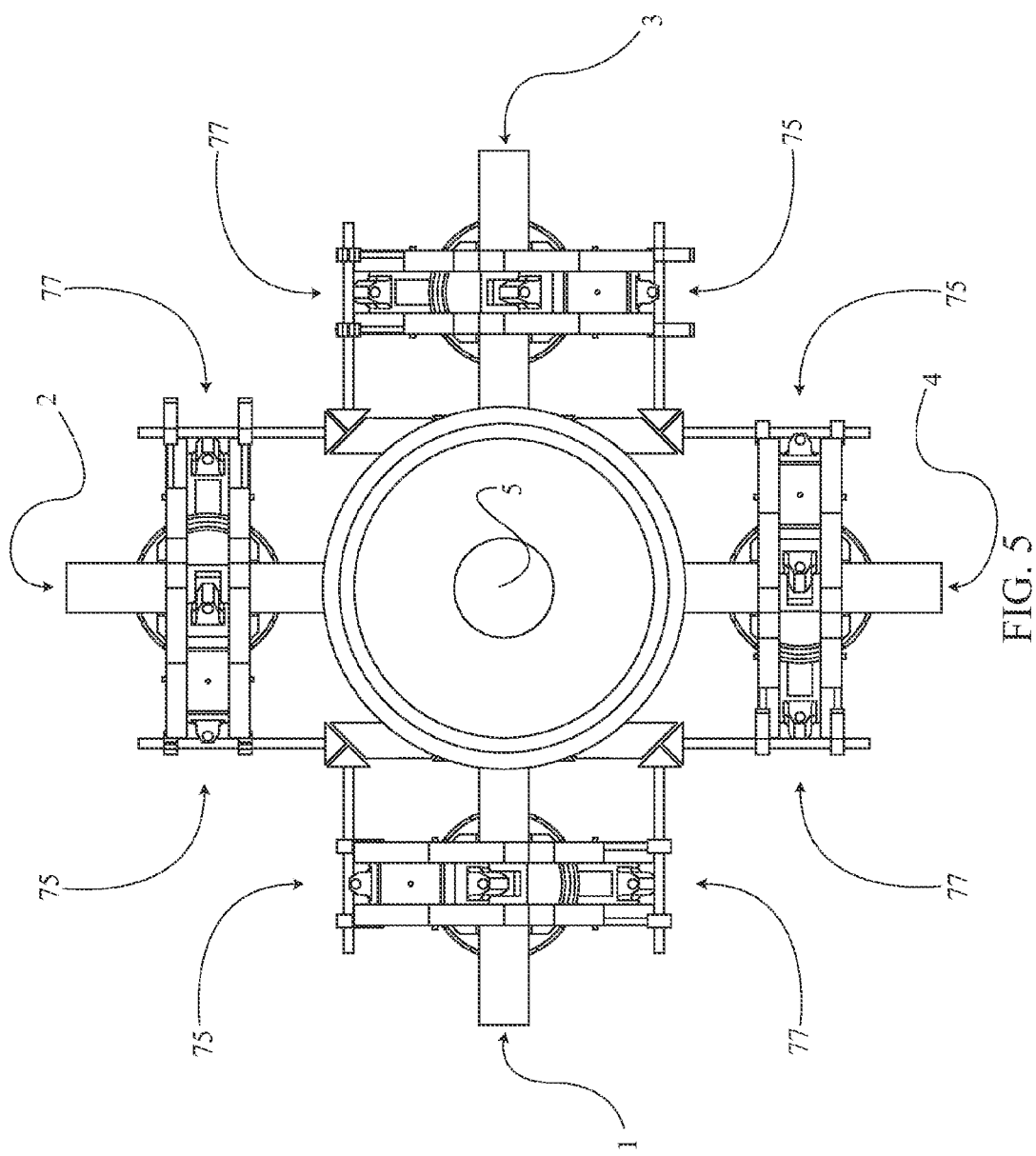
FIG. 5 is a front view of the present invention without the cylinders of the internal combustion mechanisms and emphasizes the orientation of each intake mechanism and the orientation of each exhaust mechanism.
Figure 6:
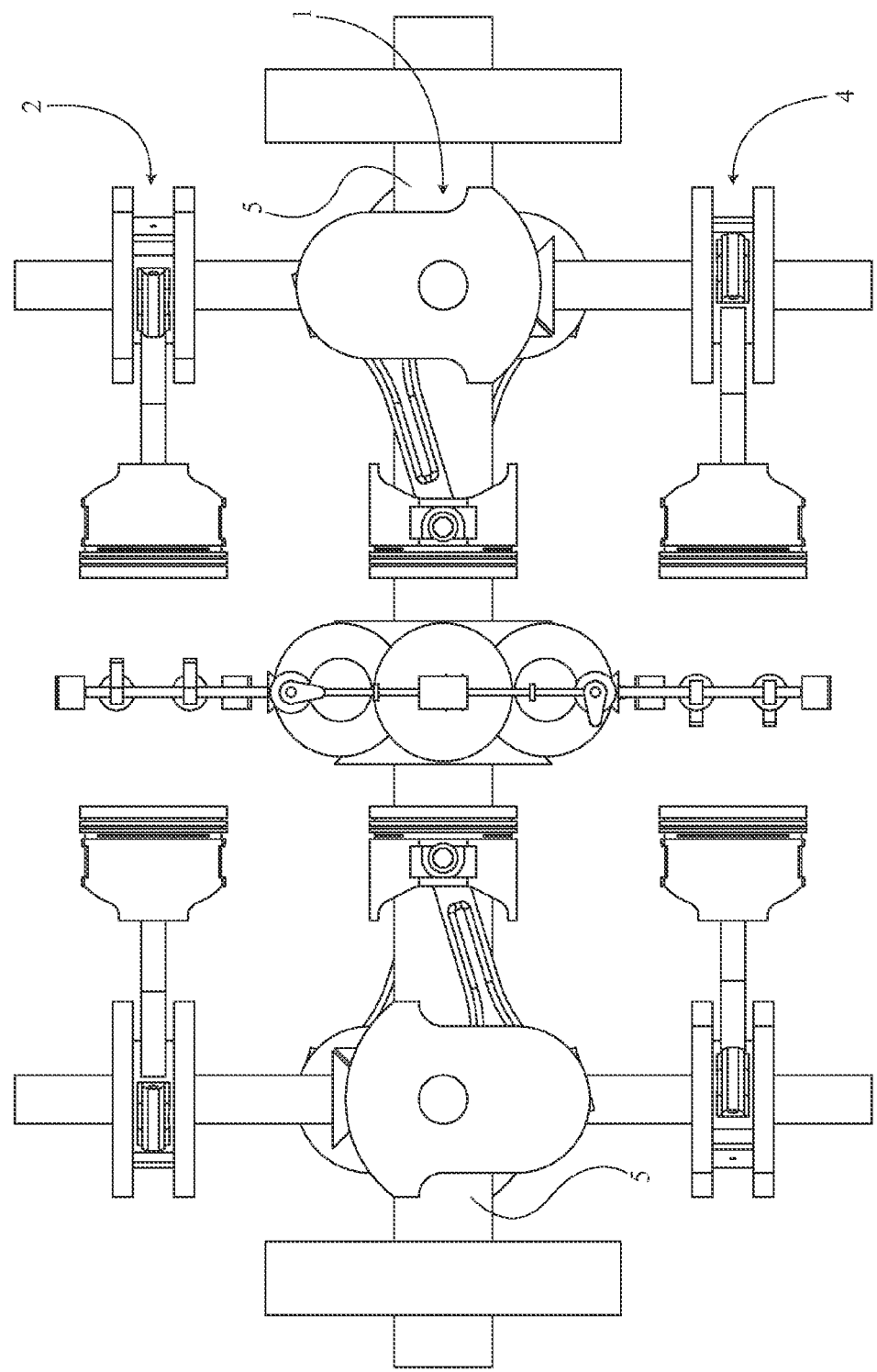
FIG. 6 is a left side view of the present invention without the cylinders of the internal combustion mechanisms.

All illustrations of the drawings are for the purpose of describing selected versions of the present invention and are not intended to limit the scope of the present invention.

The present invention is a horizontally opposed center fired engine as can be seen in FIGS. 1, 2, 3, 4, 5, and 6. The horizontally opposed center fired engine comprises a first internal combustion mechanism 1, a second internal combustion mechanism 2, a third internal combustion mechanism 3, a fourth internal combustion mechanism 4, a main axle 5, a first timing mechanism 91, and a second timing mechanism 92. The internal combustion mechanism uses a four stroke combustion cycle to provide the present invention with the means to change chemical energy into mechanical energy. The four stroke combustion cycle includes an intake stroke, a compression stroke, a power stroke, and an exhaust stroke. The timing mechanism allows the present invention to add air and remove fumes at the proper time during the four stroke combustion cycle. The main axle 5 allows the present invention to combine and store the mechanical energy created by the first internal combustion mechanism 1, the second internal combustion mechanism 2, the third internal combustion mechanism 3, and the fourth internal combustion mechanism 4.

Figure 8:
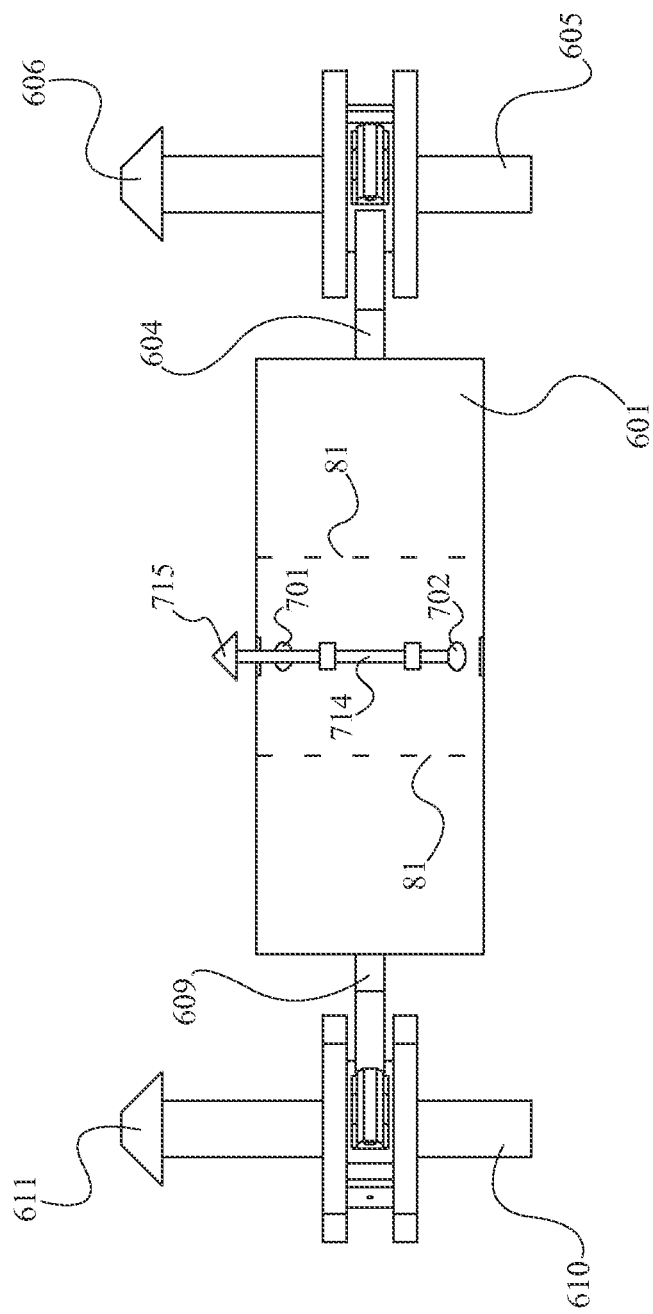
FIG. 8 is a top view of one of the internal combustion mechanisms.
Figure 9:
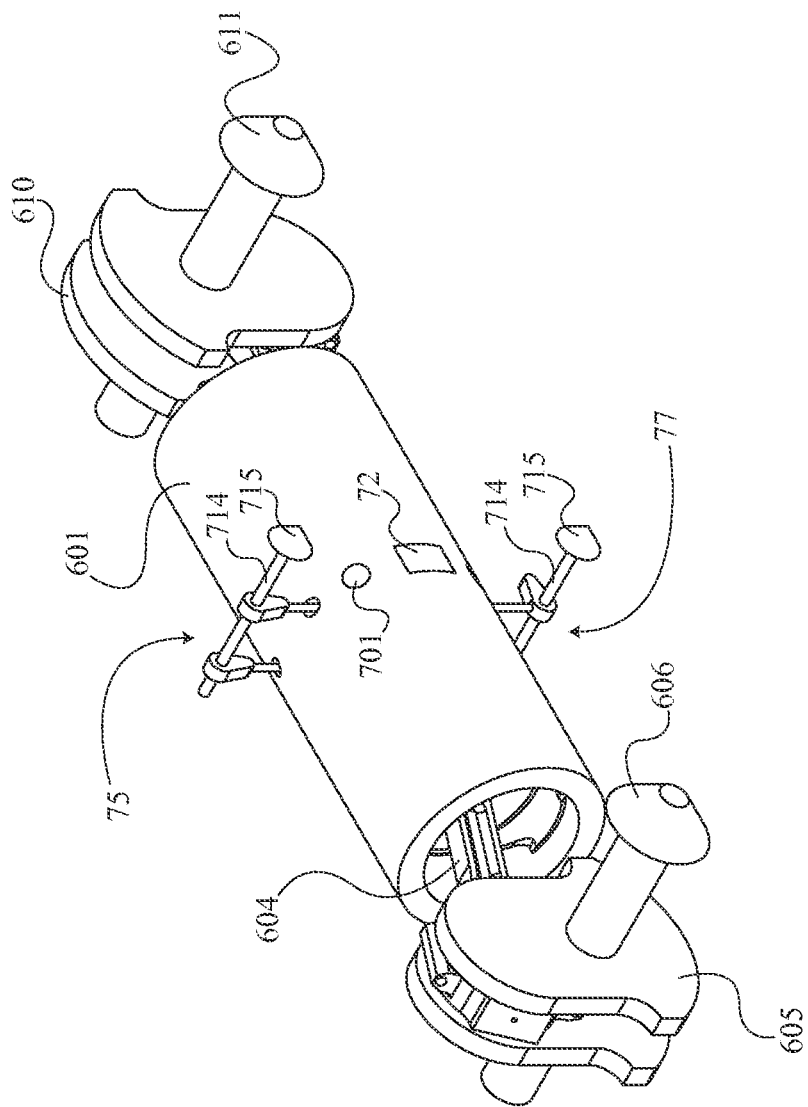
FIG. 9 is a perspective view of one of the internal combustion mechanisms.
Figure 16:
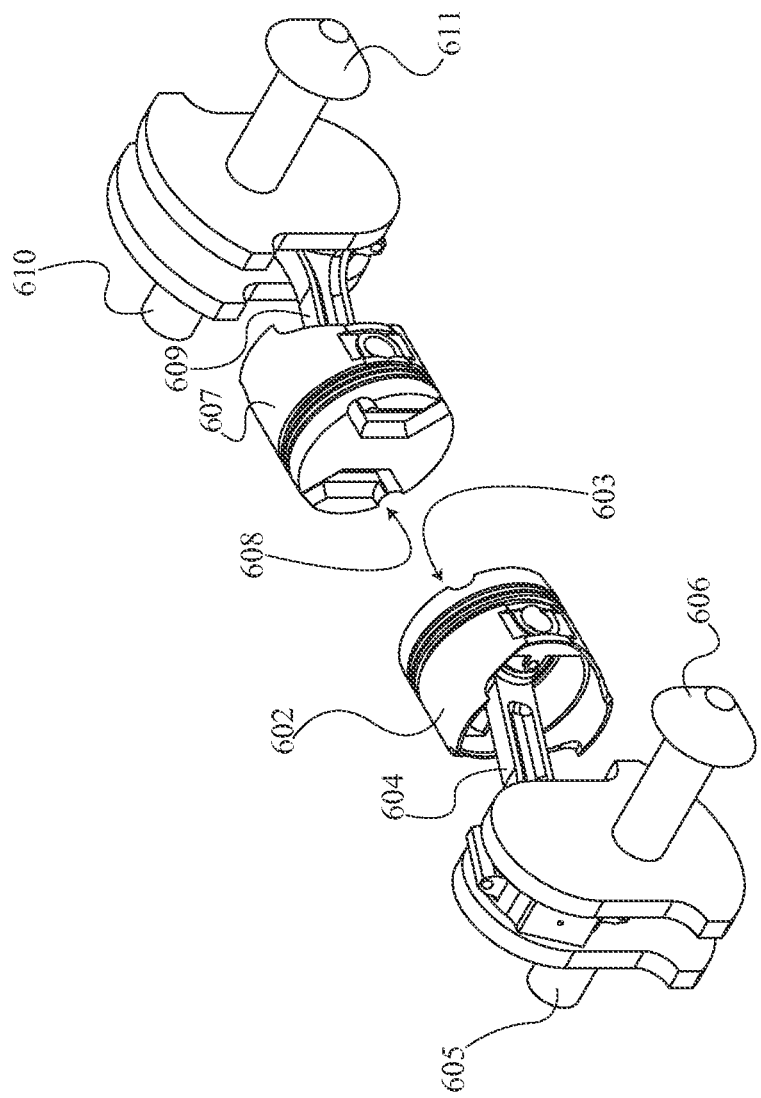
FIG. 16 is a perspective view of the front piston and the back piston illustrating the preferred embodiment of the front conformed surface and the preferred embodiment of the back conformed surface.

The internal combustion mechanism uses the common four stroke combustion cycle to produce mechanical energy and is illustrated in FIGS. 8 and 9. The first internal combustion mechanism 1, the second internal combustion mechanism 2, the third internal combustion mechanism 3, and the fourth internal combustion mechanism 4 each comprises a cylinder 601, a front piston 602, a front connecting rod 604, a front crankshaft 605, a front crankshaft gear 606, a back piston 607, a back connecting rod 609, a back crankshaft 610, a back crankshaft gear 611, a center space 71, a left block 72, a right block 73, an intake block 74, an intake mechanism 75, an exhaust block 76, an exhaust mechanism 77, and a plurality of assembly divisions 81. The cylinder 601 is a cylindrical open-ended cavity and is used to house the four stroke combustion cycle. The front piston 602 slides through the front half of the cylinder 601, while the back piston 607 slides through the back half of the cylinder 601. The linear motion of the front piston 602 and the back piston 607 is guided by the cylinder 601. Both the front piston 602 and the back piston 607 vacuum the air into the cylinder 601 during the intake stroke, compress the air-fuel mixture in the cylinder 601 during the compression stroke, change the chemical energy of the combusted air-fuel mixture into mechanical energy during the power stroke, and force the fumes out of the cylinder 601 during the exhaust stroke. The intake block 74 and the exhaust block 76 are semicircular blocks protruding into the middle of the cylinder 601. The intake block 74 and the exhaust block 76 are diametrically opposed along the lateral surface of the cylinder 601. The intake block 74 provides the intake mechanism 75 a base to operate. The intake mechanism 75 allows the air to be vacuumed into the cylinder 601 by the front piston 602 and by the back piston 607 during the intake stroke. The exhaust block 76 also provides the exhaust mechanism 77 a base to operate. The exhaust mechanism 77 allows the fumes to be pushed out of the cylinder 601 by the front piston 602 and the back piston 607 during the exhaust stroke. The left block 72 and right block 73 are rectangular blocks and located in between the intake block 74 and the exhaust block 76. The left block 72 and the right block 73 are diametrically opposed along the lateral surface of the cylinder 601. A front conformed surface 603 and a back conformed surface 608, which are shown in FIG. 16, are the circular surfaces of the front piston 602 and the back piston 607 that apply the pressure to vacuum and compress the air-fuel mixture during the four stroke combustion cycle. The front conformed surface 603 and the back conformed surface 608 are shaped to engage the protrusions and indentations created by the combination of the intake block 74, the exhaust block 76, the intake mechanism 75, the exhaust mechanism 77, the left block 72, the right block 73, and the center space 71. When the front piston 602 and the back piston 607 are fully extended into the cylinder 601 during the compression stroke, the front conformed surface 603 and the back conformed surface 608 compress the air-fuel mixture as much as possible without interfering with the mechanical movement of the intake mechanism 75 and the exhaust mechanism 77. Also, when the front piston 602 and the back piston 607 are fully extended into the cylinder 601 during the exhaust stroke, the front conformed surface 603 and the back conformed surface 608 push out as much exhaust fumes as possible without interfering with the mechanical movement of the intake mechanism 75 and the exhaust mechanism 77.

Figure 7:
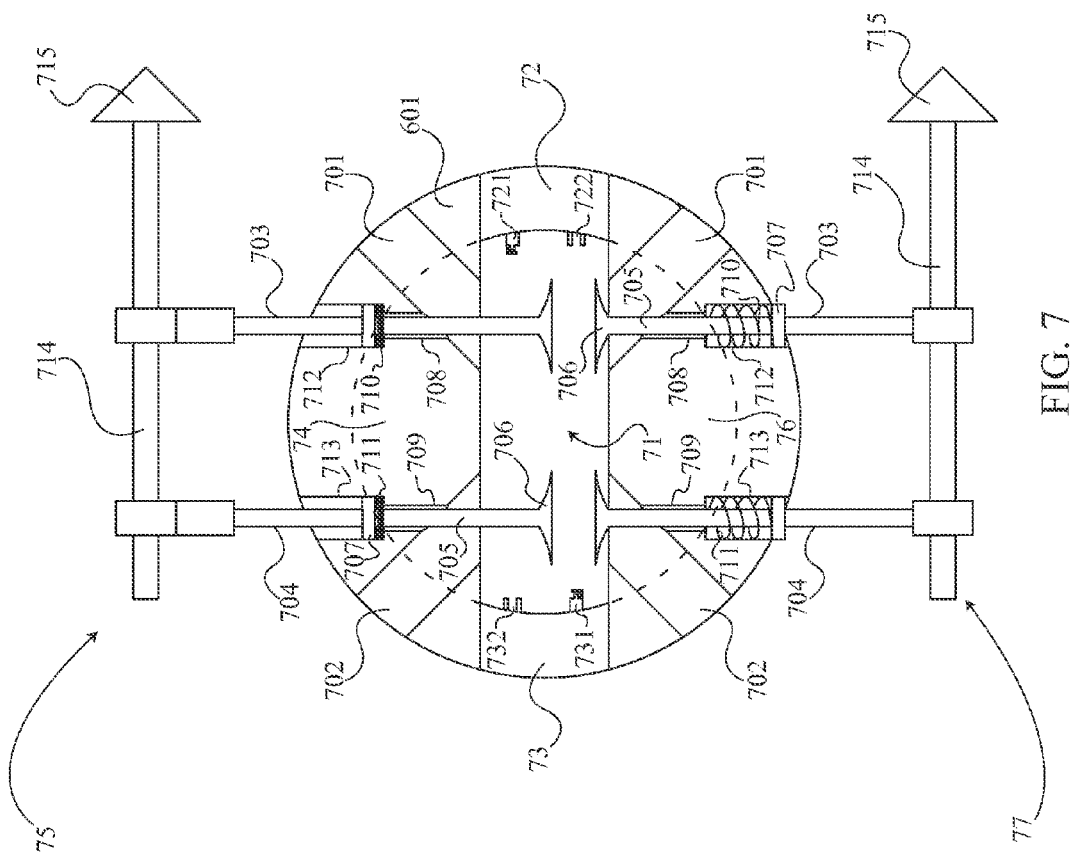
FIG. 7 is a cross sectional view of the center of the cylinder in the internal combustion mechanism.

The center space 71 shown in FIG. 7 is the volume in between the intake block 74, the exhaust block 76, the left block 72, and the right block 73. The volume of the center space 71 can be adjusted by increasing and decreasing the distance in between the left block 72 and the right block 73, which allows the internal combustion mechanism to vary the compression ratio. The left block 72 consists of a left spark plug 721 and a left direct fuel injection device 722. The left spark plug 721 and the left direct fuel injection device 722 are positioned adjacent to each other and jut into the center space 71. Similarly, the right block 73 consists of a right spark plug 731 and a right direct fuel injection device 732. The right spark plug 731 and the right direct fuel injection device 732 are positioned adjacent to each other and jut into the center space 71. The right spark plug 731 is also positioned on the right block 73 opposite of the left direct fuel injection device 722 on the left block 72, and the right direct fuel injection device 732 is positioned on the right block 73 opposite of the left spark plug 721 on the left block 72. The left direct fuel injection device 722 and the right direct fuel injection device 732 add fuel to the air being vacuumed in during the intake stroke in order to create a homogenous air-fuel mixture. The left spark plug 721 and the right spark plug 731 ignite the homogeneous air-fuel mixture at the end of the compression stroke in order to initiate the power stroke. The arrangement of the left spark plug 721, right spark plug 731, the left direct fuel injection device 722, and the right direct fuel injection device 732 allow the internal combustion mechanism to evenly mix and to symmetrically ignite the homogeneous air-fuel mixture.

Figure 10:
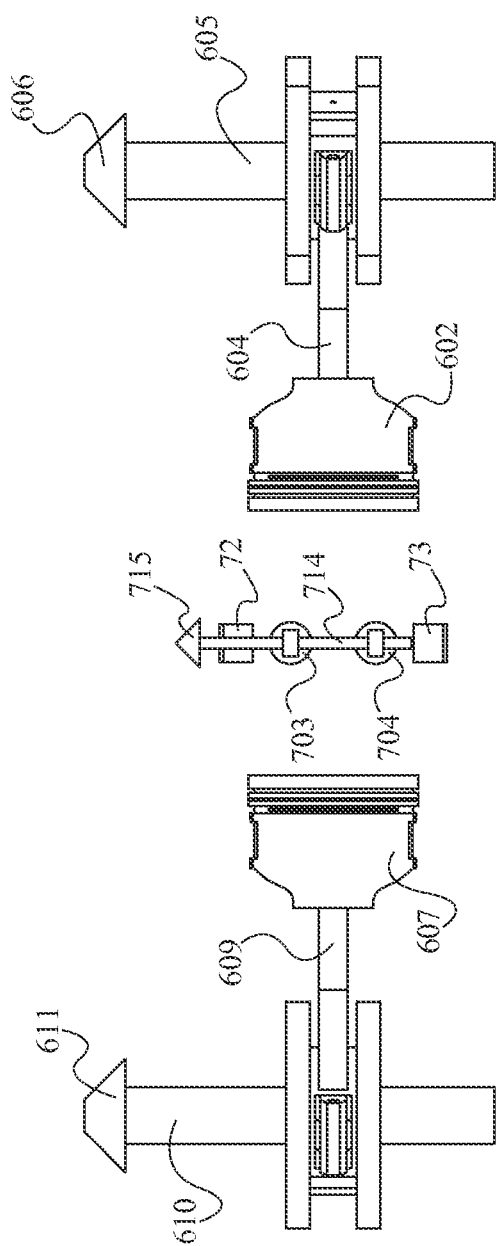
FIG. 10 is a top view of one of the internal combustion mechanisms without the cylinder.
Figure 11:
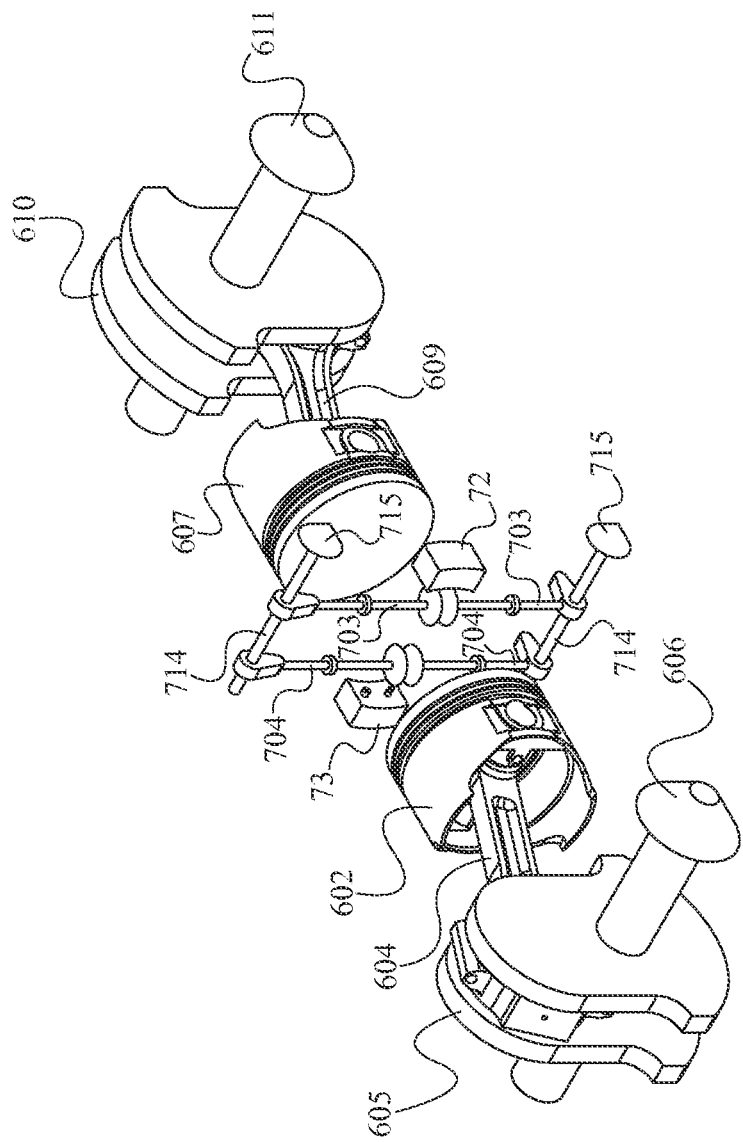
FIG. 11 is a perspective view of one of internal combustion mechanisms without the cylinder.

In FIGS. 10 and 11, the components involved in transferring the linear motion of the front piston 602 and the back piston 607 to the main axle 5 include the front connecting rod 604, the back connecting rod 609, the front crankshaft 605, the back crankshaft 610, the front crankshaft gear 606, and the back crankshaft gear 611. The front connecting rod 604 is jointly connected to the front piston 602 at one end and is jointly connected to the front crankshaft 605 at the other end. The front connecting rod 604 transfers the linear motion of the front piston 602 during the four stroke combustion cycle to the front crankshaft 605. The front crankshaft 605 changes the linear motion of the front piston 602 during the four stroke combustion cycle into rotational motion. The front crankshaft 605 rotates on an axis perpendicular to the linear motion of the front piston 602. The combination of the front connecting rod 604 and the front crankshaft 605 prevents the front piston 602 from going too far into or out of the front half of the cylinder 601. The front crankshaft gear 606 concentrically connects to the front crankshaft 605 and allows the front crankshaft 605 to feed the rotational motion into the main axle 5. Similarly, the back connecting rod 609 is jointly connected to the back piston 607 at one end and is jointly connected to the back crankshaft 610 at the other end. The back connecting rod 609 transfers the linear motion of the back piston 607 to the back crankshaft 610. The back crankshaft 610 changes the linear motion of the back piston 607 during the four stroke combustion cycle into rotational motion. The back crankshaft 610 rotates on an axis perpendicular to the linear motion of the back piston 607. The combination of the back connecting rod 609 and the back crankshaft 610 prevents the back piston 607 from going too far into or out of the back half of the cylinder 601. The back crankshaft gear 611 concentrically connects to the back crankshaft 610 and allows the back crankshaft 610 to feed the rotational motion into the main axle 5.

Both the intake mechanism 75 and the exhaust mechanism 77 allow gases into and out of the cylinder 601 during specific strokes of the four stroke combustion cycle and are shown in FIG. 7. The intake mechanism 75 and the exhaust mechanism 77 each comprise a left port 701, a right port 702, a left valve 703, a right valve 704, a left valve guide 708, a right valve guide 709, a left valve spring 710, a right valve spring 711, a left spring cavity 712, a right spring cavity 713, a camshaft 714, and a camshaft gear 715. The left port 701 and the right port 702 traverse through the cylinder 601 and the intake block 74 for the intake mechanism 75 and through the cylinder 601 and the exhaust block 76 for the exhaust mechanism 77. The left port 701 and right port 702 are tunnels that guide the gases into and out of the cylinder 601 during the four stroke combustion cycle. The left port 701 and the right port 702 of the intake mechanism 75 guides air into the cylinder 601 during the intake stroke, and the left port 701 and the right port 702 of the exhaust mechanism 77 guides fumes out of the cylinder 601 during the exhaust stroke. In the preferred embodiment of the intake mechanism 75 and the exhaust mechanism 77, the left port 701 and the right port 702 are straight tunnels that angled towards each other. Also in the preferred embodiment, the diameters of the left port 701 and the right port 702 are larger than the thickness of the intake block 74 or the exhaust block 76, which cause the intake block 74 or the exhaust block 76 to protrude in the areas encompassing the left port 701 and the right port 702. The front conformed surface 603 and the back conformed surface 608 should be shaped to accommodate the protruded areas with concave grooves in the preferred embodiment.

The left valve 703 and the right valve 704 allow the intake mechanism 75 and the exhaust mechanism 77 to open and close the left port 701 and the right port 702. The left valve 703 and the right valve 704 each comprise a stem 705, a lid 706, and a stop 707. The left valve 703 seals the left port 701 with the lid 706 of the left valve 703, and the right valve 704 seals the right port 702 with the lid 706 of the right valve 704. For the intake mechanism 75, the left valve 703 and the right valve 704 seal the left port 701 and the right port 702 during the compression stroke, the power stroke, and the exhaust stroke. For the exhaust mechanism 77, the left valve 703 and the right valve 704 seal the left port 701 and the right port 702 during the intake stroke, the compression stroke, and the power stroke. In the preferred embodiment, the motion of the left valve 703 and the right valve 704 is normal to the plane containing the center axis of the front crankshaft 605 and the center axis of the back crankshaft 610. The left port 701 is shaped in such a way that the linear motion of the left valve 703 intersects into the left port 701. Likewise, the right port 702 is shaped in such a way that the linear motion of the right valve 704 intersects into the right port 702. The left valve guide 708 is a tunnel that guides the linear motion of the left valve 703 by encircling the stem 705 of the left valve 703. The right valve guide 709 is also a tunnel that guides the linear motion of the right valve 704 by encircling the stem 705 of the right valve 704. In the preferred embodiment, the left valve guide 708 and the right valve guide 709 are also normal to the plane containing the center axis of the front crankshaft 605 and the center axis of the back crankshaft 610. The left valve guide 708 intersects with the left port 701 on one end and collinearly connected to the left spring cavity 712 on the other end. Similarly, the right valve guide 709 intersects with the right port 702 on one end and collinearly connects to the right spring cavity 713 on the other end. The left spring cavity 712 and the right spring cavity 713 respectively house the left valve spring 710 and the right valve spring 711. The left valve spring 710 applies the force required to close the left port 701 with the left valve 703, and the right valve spring 711 applies the force required to close the right port 702 with the right valve 704. In order for the left valve spring 710 and the right valve spring 711 to apply the force on the left valve 703 and the right valve 704, the left valve spring 710 presses against the stop 707 of the left valve 703 and the right valve spring 711 presses against the stop 707 of the right valve 704. The stop 707 is a flange on the stem 705 that the left valve spring 710 or the right valve spring 711 presses against to apply the force required to close either the left port 701 with the left valve 703 or the right port 702 with the right valve 704. The camshaft 714 opens the left valve 703 and the right valve 704 at the appropriate intervals during the four stroke combustion cycle. The camshaft 714 of the intake mechanism 75 pushes against the left valve 703 and the right valve 704 to open the left port 701 and the right port 702 during the intake stroke in order to allow the front piston 602 and the back piston 607 to vacuum air into the cylinder 601. The camshaft 714 of the exhaust mechanism 77 pushes against the left valve 703 and the right valve 704 to open the left port 701 and the right port 702 during the exhaust stroke in order to allow the front piston 602 and the back piston 607 to push the fumes out of the cylinder 601. The camshaft gear 715 is concentrically connected to the end of the camshaft 714 and allows the timing mechanism to engage and rotate the camshaft 714 with the proper timing.

The arrangement of the components for the internal combustion mechanism allows for a much higher compression ratio during the compression stroke. The cylinder 601 allows for a larger volume of air-fuel mixture to be compressed. A conventional cylinder allows for a smaller volume to be compressed because the four stroke combustion cycle is orchestrated by only one piston. The front piston 602 and the back piston 607 allow the internal combustion mechanism to compress a larger volume during the compression stroke. The conventional cylinder would require a long connecting rod to compress a larger volume with only one piston, which would cause more vibrations. The present invention uses two connecting rods, the front connecting rod 604 and the back connecting rod 609, in order to reduce the vibrations and to allow for higher rotations per minute, while compressing a larger volume of air-fuel mixture during the compression stroke.

The plurality of assembly divisions 81 partitions the cylinder 601 into pieces that allow manufactures to easily assemble the internal combustion mechanism. In one embodiment, the internal combustion mechanism can have two assembly divisions. One assembly division would be on the front half of the cylinder 601 where the front piston 602 stops when fully extended. The other assembly division would on the back half of the cylinder 601 where the back piston 607 stops when fully extended. The first portion of the cylinder 601 houses the front piston 602 and guides the front piston 602 forwards and backwards. The second or middle portion of the cylinder 601 would contain the intake block 74, the exhaust block 76, the left block 72, the right block 73, the intake mechanism 75, and the exhaust mechanism 77. In this embodiment, the left port 701, the right port 702, the left valve guide 708, the right valve guide 709, the left spring cavity 712, and the right spring cavity 713 would be drilled the full 360 degrees into the intake block 74 and the exhaust block 76. Finally, the third portion of the cylinder 601 houses the back piston 607 and guides the back piston 607 forwards and backwards. In another embodiment, the internal combustion mechanism has only one assembly division. This assembly division would be in the middle of the cylinder 601 and would divide the cylinder 601, the intake block 74 and the exhaust block 76. The left valve 703, the right valve 704, the left valve guide 708, the right valve guide 709, the left spring cavity 712, and the right spring cavity 713 of both the intake mechanism 75 and the exhaust mechanism 77 would have to be two 180 degree concaves drilled into both the divided intake block 74 and the divided exhaust block 76.

Figure 12:
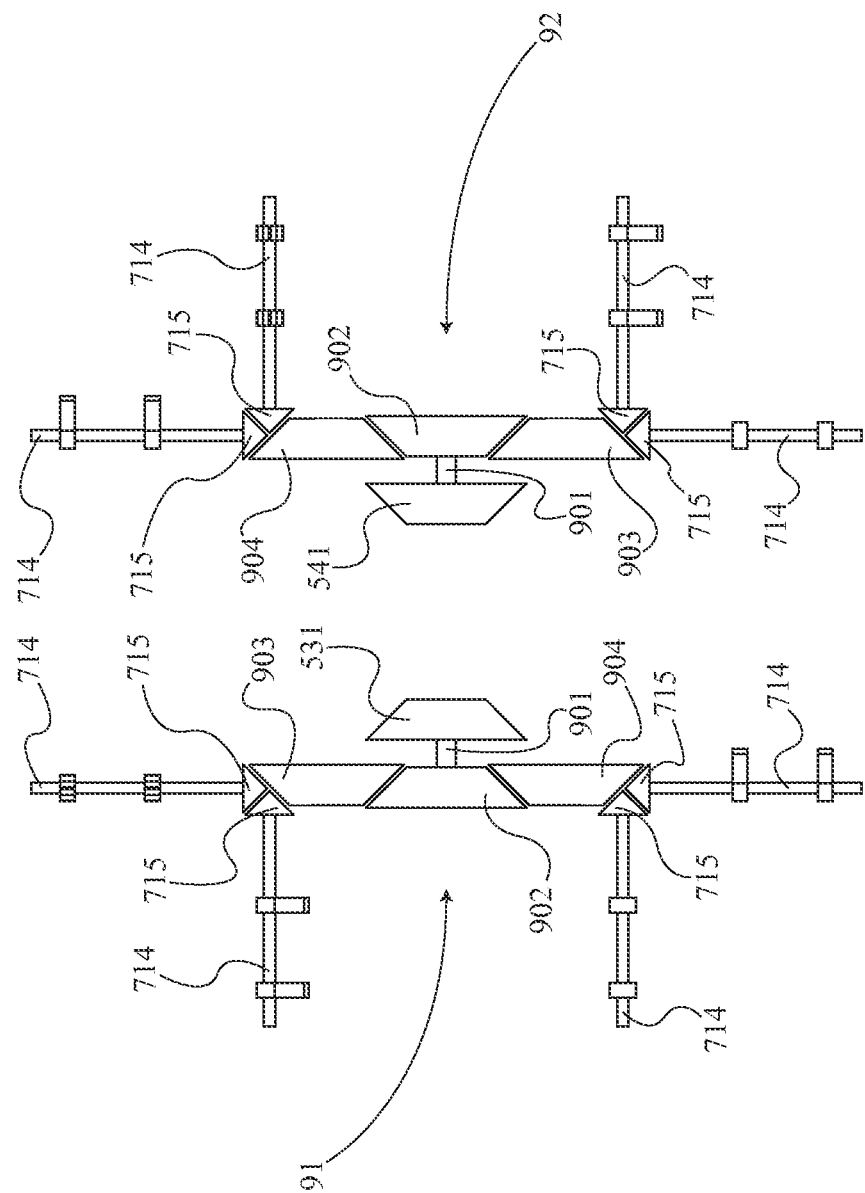
FIG. 12 is a front view of the timing mechanisms highlighting their connection to the internal combustion mechanisms and the main axle.
Figure 13:
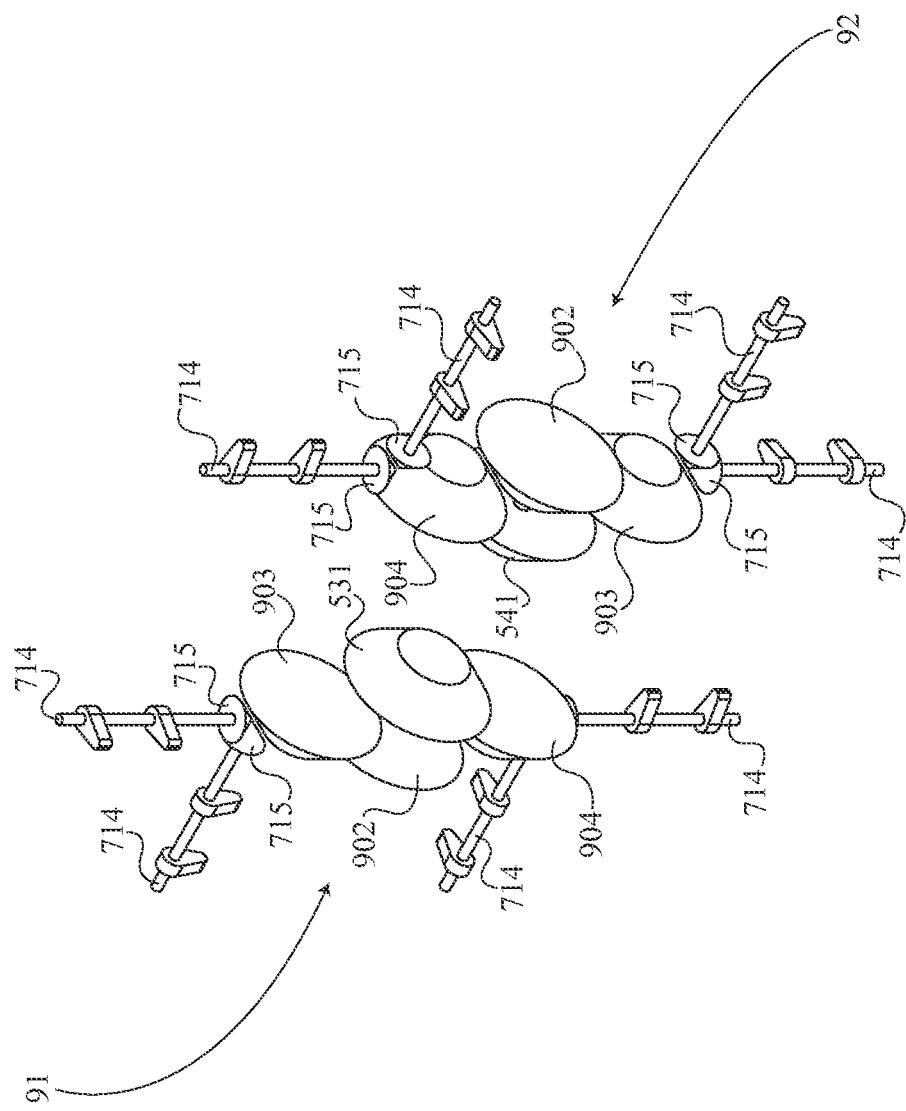
FIG. 13 is a perspective view of the timing mechanisms highlighting their connection to the internal combustion mechanisms and the main axle.

The timing mechanism shown in FIGS. 12 and 13 feeds the rotational motion from the main axle 5 into both the intake mechanism 75 and the exhaust mechanism 77 and allows the intake mechanism 75 and the exhaust mechanism 77 to function with the proper timing in the four stroke combustion cycle. The first timing mechanism 91 and second timing mechanism 92 each comprises a timing shaft 901, a main timing gear 902, an intake timing gear 903, and an exhaust timing gear 904. The timing mechanism receives the rotational motion from the main axle 5 with the timing shaft 901. The timing shaft 901 rotates on an axis perpendicular to the main axle 5. The timing shaft 901 rotates the main timing gear 902, which concentrically connected to the timing shaft 901. The intake timing gear 903 and the exhaust timing gear 904 are diametrically opposed and engaged to the main timing gear 902. The intake mechanism 75 is engaged to the intake timing gear 903 opposite to the main timing gear 902. The exhaust mechanism 77 is engaged to the exhaust timing gear 904 opposite to the main timing gear 902. The main timing gear 902, the intake timing gear 903, and the exhaust timing gear 904 are designed with the appropriate gear ratios in order to rotate the intake mechanism 75 and the exhaust mechanism 77 with proper timing.

Figure 14:
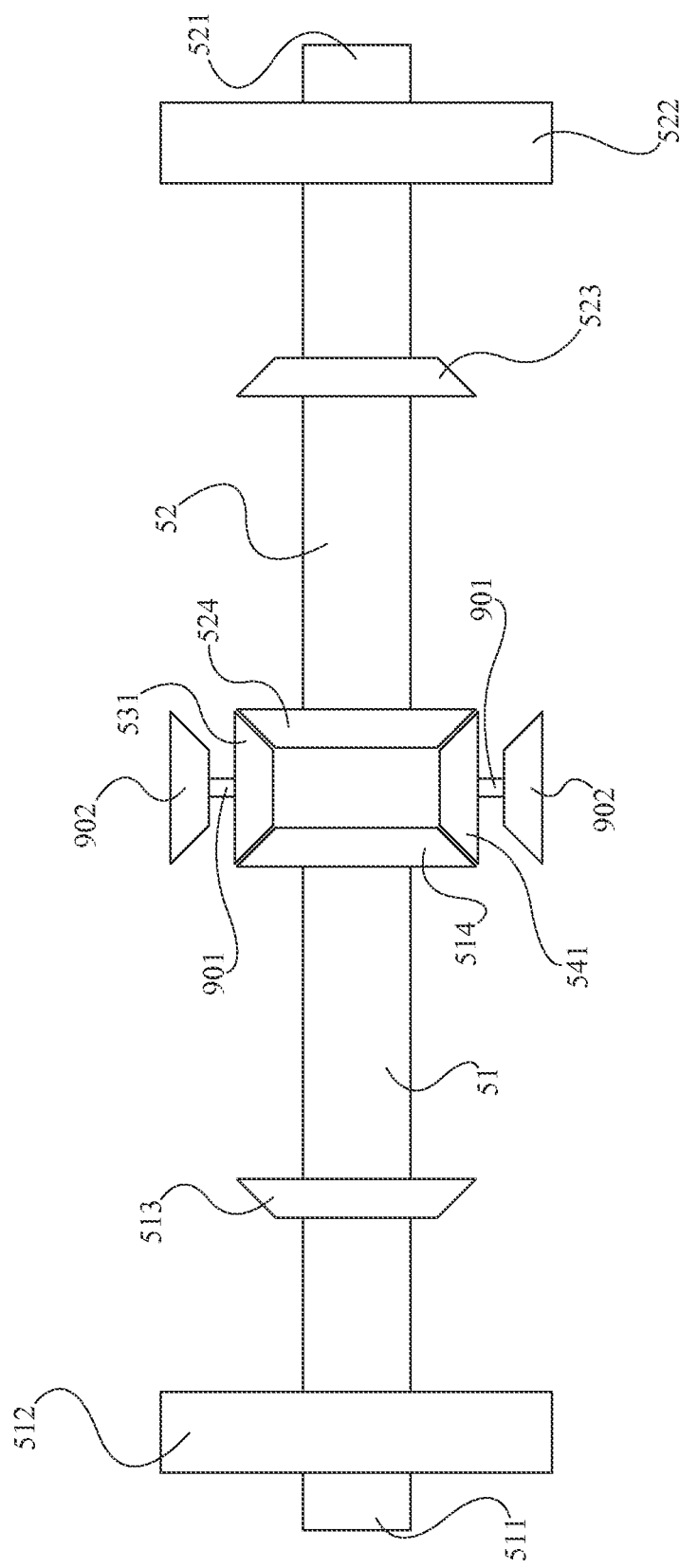
FIG. 14 is a top view of the main axle.
Figure 15:
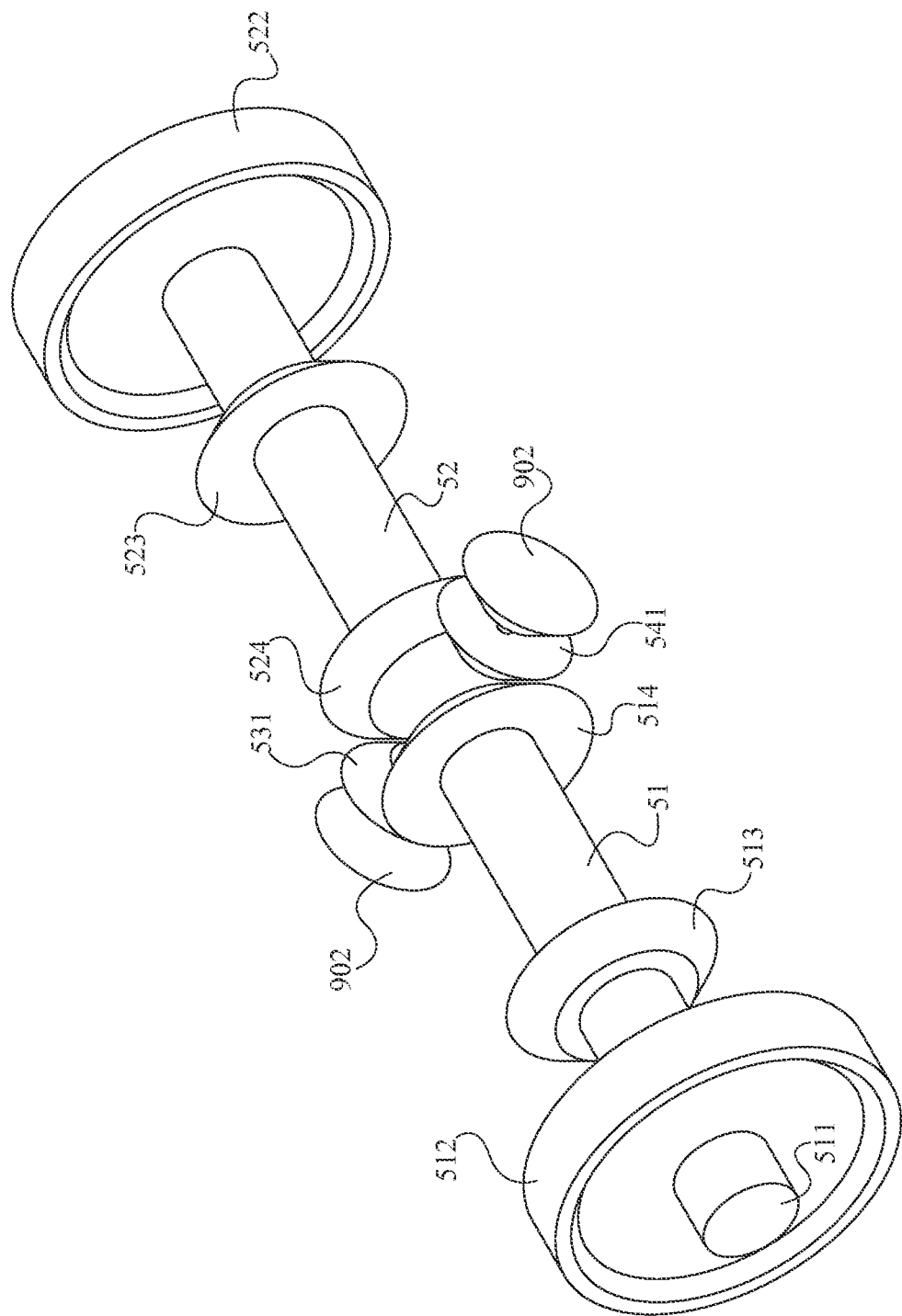
FIG. 15 is a perspective view of the main axle.

The main axle 5, which is shown in FIGS. 14 and 15, combines the torque provided by the rotational motion of both the front crankshaft 605 and the back crankshaft 610 of the first internal combustion mechanism 1, the second internal combustion mechanism 2, the third internal combustion mechanism 3, and the fourth internal combustion mechanism 4. The main axle 5 comprises a front shaft 51, a front output 511, a front flywheel 512, a front input gear 513, a front axle gear 514, a back shaft 52, a back output 521, a back flywheel 522, a back input gear 523, a back axle gear 524, a first side gear 531, and a second side gear 541. The front shaft 51 is positioned on the center axis of the present invention. The front output 511 is located at one end of the front shaft 51, and the front axle gear 514 is located at the other end of the front shaft 51. The front input gear 513 is concentrically connected along the front shaft 51 in between the front output 511 and the front axle gear 514. The front input gear 513 is a bevel gear, which is simultaneously engaged to the front crankshaft gear 606 of the first internal combustion mechanism 1, the front crankshaft gear 606 of the second internal combustion mechanism 2, the front crankshaft gear 606 of the third internal combustion mechanism 3, and the front crankshaft gear 606 of the fourth internal combustion mechanism 4. The front flywheel 512 is a solid disk, which is concentrically connected along the front shaft 51 in between the front output 511 and the front input gear 513. The front flywheel 512 steadies the rotational motion fed into the front input gear 513 because the linear motion of the front piston 602 occurs in intervals during the four stroke combustion cycle and, thus, the rotational motion of the front crankshaft 605 is choppy. Similarly, the back shaft 52 is positioned on the center axis of the present invention. The back output 521 is located at one end of the back shaft 52, and the back axle gear 524 is located at the other end of the back shaft 52. The back input gear 523 is concentrically connected along the back shaft 52 in between the back output 521 and the back axle gear 524. The back input gear 523 is a bevel gear, which is simultaneously engaged to the back crankshaft gear 611 of the first internal combustion mechanism 1, the back crankshaft gear 611 of the second internal combustion mechanism 2, the back crankshaft gear 611 of the third internal combustion mechanism 3, and the back crankshaft gear 611 of the fourth internal combustion mechanism 4. The back flywheel 522 is a solid disk, which is concentrically connected along the back shaft 52 in between the back output 521 and the back input gear 523. The back flywheel 522 steadies the rotational motion fed into the back input gear 523 because the linear motion of the back piston 607 occurs in intervals during the four stroke combustion cycle and, thus, the rotational motion of the back crankshaft 610 is choppy.

The front shaft 51 and the back shaft 52 is designed to rotate in different directions because a torque created by the rotation of the front shaft 51 cancels an opposing torque created by the rotation of the back shaft 52. The connection arrangement between the front shaft 51 and the back shaft 52 must be able to accommodate the different rotational directions. The front shaft 51 and the back shaft 52 are positioned on the center axis of the present invention with the front axle gear 514 and the back axle gear 524 facing each other. The front axle gear 514 and the back axle gear 524 are bevel gears. The first side gear 531 is a bevel gear, which is perpendicularly engaged to both the front axle gear 514 and the back axle gear 524. The second side gear 541 is also a bevel gear, which is perpendicularly engaged to both the front axle gear 514 and the back axle gear 524 opposite to the first side gear 531. The front axle gear 514, the back axle gear 524, the first side gear 531, and the second side gear 541 form a square arrangement of bevel gears, which allows the front shaft 51 and the back shaft 52 to rotate in different directions. In addition, the front output 511 and the back output 521 should be connected to two different output devices such as two transmissions, two electric generators, or one of each in order to take better advantage of the present invention's symmetrical design. In a conventional engine design with only one output, when the horsepower or torque output increases or decreases, the engine experience a change in rotational inertia and will apply a torque opposing the change in rotational inertia on the chassis, which is a major cause of vibrations and a loss of energy. The present invention's symmetrical design will minimize the vibrations and increase the efficiency of the present invention because the front output 511 and the back output 521 rotate in different directions. When the front shaft 51 and the back shaft 52 each apply a torque opposing the change of rotational inertia on the chassis, the opposing torque created by the front shaft 51 and the opposing torque created by the back shaft 52 are in opposite rotational directions and, thus, cancel each other out. In order to take full advantage of the different rotational directions of the front shaft 51 and the back shaft 52, the chassis needs to be very rigid so that the different rotational direction of the front shaft 51 and the back shaft 52 rotates the two different output devices and does not produce torsion on the chassis.

The arrangement of the first internal combustion mechanism 1, the second internal combustion mechanism 2, the third internal combustion mechanism 3, the fourth internal combustion mechanism 4, the first timing mechanism 91, the second timing mechanism 92, and the main axle 5 is symmetrical and allows the present invention to avoid many problems associated with engine balance. The main axle 5 is positioned along the center axis of the present invention. The first internal combustion mechanism 1, the second internal combustion mechanism 2, the third internal combustion mechanism 3, and the fourth internal combustion mechanism 4 are radially and symmetrically positioned around the main axle 5. The length of the cylinder 601 of the first internal combustion mechanism 1, the second internal combustion mechanism 2, the third internal combustion mechanism 3, and the fourth internal combustion mechanism 4 is parallel to the center axis of the present invention. The front crankshaft gears 606 of the first internal combustion mechanism 1, the second internal combustion mechanism 2, the third internal combustion mechanism 3, and the fourth internal combustion mechanism 4 are symmetrically engaged to the front input gear 513. Likewise, the back crankshaft gears 611 of the first internal combustion mechanism 1, the second internal combustion mechanism 2, the third internal combustion mechanism 3, and the fourth internal combustion mechanism 4 are symmetrically engaged to the back input gear 523. The timing shaft 901 of the first timing mechanism 91 is concentrically connected to the first side gear 531 and is normal to the plane of the first side gear 531. The intake timing gear 903, the main timing gear 902, and the exhaust timing gear 904 for the first timing mechanism 91 are collinearly positioned to be perpendicular to the length of the cylinder 601 and perpendicular to the timing shaft 901 of the first timing mechanism 91. The intake camshaft gear 715 of the first internal combustion mechanism 1 and the intake camshaft gear 715 of the second internal combustion mechanism 2 are both engaged to the intake timing gear 903 of the first timing mechanism 91, which positions the intake camshaft 714 of the first internal combustion mechanism 1 parallel to the timing shaft 901 of the first timing mechanism 91 and positions the intake camshaft 714 of the second internal combustion mechanism 2 to be collinear with the intake timing gear 903, the main timing gear 902, and the exhaust timing gear 904 of the first timing mechanism 91. The exhaust camshaft gear 715 of the first internal combustion mechanism 1 and the exhaust camshaft gear 715 of the fourth internal combustion mechanism 4 are both engaged to the exhaust timing gear 904 of the first timing mechanism 91, which positions the exhaust camshaft 714 of the first internal combustion mechanism 1 parallel to the timing shaft 901 of the first timing mechanism 91 and positions the exhaust camshaft 714 of the fourth internal combustion mechanism 4 to be collinear with the intake camshaft 714 of the second internal combustion mechanism 2. Similarly, the timing shaft 901 of the second timing mechanism 92 is concentrically connected to the second side gear 541 and is normal to the plane of the second side gear 541. The exhaust timing gear 904, the main timing gear 902, and the intake timing gear 903 for the second timing mechanism 92 are collinearly positioned to be perpendicular to the length of the cylinder 601 and perpendicular to the timing shaft 901 of the second timing mechanism 92. The intake camshaft gear 715 of the third internal combustion mechanism 3 and the intake camshaft gear 715 of the fourth internal combustion mechanism 4 are both engaged to the intake timing gear 903 of the second timing mechanism 92, which positions the intake camshaft 714 of the third internal combustion mechanism 3 parallel to the timing shaft 901 of the second timing mechanism 92 and positions the intake camshaft 714 of the fourth internal combustion mechanism 4 to be collinear with the exhaust timing gear 904, the main timing gear 902, and the intake timing gear 903 of the second timing mechanism 92. The exhaust camshaft gear 715 of the third internal combustion mechanism 3 and the exhaust camshaft gear 715 of the second internal combustion mechanism 2 are both engaged to the exhaust timing gear 904 of the second timing mechanism 92, which positions the exhaust camshaft 714 of the third internal combustion mechanism 3 parallel to the timing shaft 901 of the second timing mechanism 92 and positions the exhaust camshaft 714 of the second internal combustion mechanism 2 to be collinear with the intake camshaft 714 of the fourth internal combustion mechanism 4.

The first internal combustion mechanism 1, the second internal combustion mechanism 2, the third internal combustion mechanism 3, and the fourth internal combustion mechanism 4 can be adjusted to have any firing order. The firing order is the order in which the first internal combustion mechanism 1, the second internal combustion mechanism 2, the third internal combustion mechanism 3, and the fourth internal combustion mechanism 4 ignite the compressed air-fuel mixture in between the compression stroke and the power stroke. In the FIGS. 1, 2, 3, 4, 5, 6, 12, and 13, the present invention has a firing order of 1234, where the first internal combustion mechanism 1 is shown in the intake stroke, the second internal combustion mechanism 2 is shown in the compression stroke, the third internal combustion mechanism 3 is shown in the power stroke, and the fourth internal combustion mechanism 4 is shown in the exhaust stroke.

Although the invention has been explained in relation to its preferred embodiment, it is to be understood that many other possible modifications and variations can be made without departing from the spirit and scope of the invention as hereinafter claimed.

What is claimed is:

1. A horizontally opposed center fired engine comprises,
   a first internal combustion mechanism;
   a second internal combustion mechanism;
   a third internal combustion mechanism;
   a fourth internal combustion mechanism;
   a first timing mechanism;
   a second timing mechanism;
   a main axle;
   said first internal combustion mechanism, said second internal combustion mechanism, said third internal combustion mechanism, and said fourth internal combustion mechanism each comprises a cylinder, a front piston, a front connecting rod, a front crankshaft, a front crankshaft gear, a back piston, a back connecting rod, a back crankshaft, a back crankshaft gear, a center space, a left block, a right block, an intake block, an intake mechanism, an exhaust block, an exhaust mechanism, and a plurality of assembly divisions;
   said first timing mechanism and said second timing mechanism each comprises a timing shaft, a main timing gear, a intake timing gear, and an exhaust timing gear;
   said main axle comprises a front shaft, a front flywheel, a front input gear, a front axle gear, a front output, a back shaft, a back flywheel, a back input gear, a back axle gear, a back output, a first side gear, and a second side gear; and
   said intake mechanism and said exhaust mechanism each comprises a left port, a right port, a left valve, a right valve, a left valve guide, a right valve guide, a left valve spring, a right valve spring, a left spring cavity, a right spring cavity, a camshaft, and a camshaft gear.

2. The horizontally opposed center fired engine as claimed in claim 1 comprises,
   said main axle being located in between said first internal combustion mechanism and said third internal combustion mechanism;
   said main axle being located in between said second internal combustion mechanism and said fourth internal combustion mechanism;
   said first internal combustion mechanism, said second internal combustion mechanism, said third internal combustion mechanism, and said fourth internal combustion mechanism being positioned equidistant from said main axle;
   said fourth internal combustion mechanism and said second internal combustion mechanism being positioned equidistant from said first internal combustion mechanism;
   said first internal combustion mechanism and said third internal combustion mechanism being positioned equidistant from said second internal combustion mechanism;
   said second internal combustion mechanism and said fourth internal combustion mechanism being positioned equidistant from said third internal combustion mechanism; and
   said third internal combustion mechanism and said first internal combustion mechanism being positioned equidistant from said fourth internal combustion mechanism.

3. The horizontally opposed center fired engine as claimed in claim 1 comprises,
   said main axle being positioned in between said first timing mechanism and said second timing mechanism; and
   said first timing mechanism and said second timing mechanism being positioned equidistant from said main axle.

4. The horizontally opposed center fired engine as claimed in claim 1 comprises,
   said intake block and said exhaust block being centrally located within said cylinder;
   said intake block and said exhaust block being diametrically opposed within said cylinder;
   said left block and said right block being centrally located within said cylinder;
   said left block and said right block being diametrically opposed within said cylinder;
   said left block and said right block being positioned in between said intake block and said exhaust block;

said center space being formed in between said left block, said right block, said intake block, and said exhaust block;
said left block comprises a left spark plug and a left direct fuel injection device;
said right block comprises a right spark plug and a right direct fuel injection device;
said left spark plug being positioned adjacent to said left direct fuel injection device;
said left spark plug and said left direct fuel injection device protruding into said center space;
said right spark plug being positioned adjacent to said right direct fuel injection device;
said right spark plug and said right direct fuel injection device protruding into said center space;
said left spark plug being positioned opposite said right direct fuel injection device; and
said right spark plug being positioned opposite said left direct fuel injection device.

5. The horizontally opposed center fired engine as claimed in claim 1 comprises,
said front piston and said back piston being encircled by said cylinder;
said front piston being positioned opposite to said back piston within said cylinder;
said front piston having a front conformed surface;
said front connecting rod being jointly connected to said front piston opposite to said front conformed surface;
said front crankshaft being jointly connected to said front connecting rod opposite of said front piston;
said front crankshaft gear being concentrically connected to said front crankshaft;
said back piston having a back conformed surface;
said back connecting rod being jointly connected to said back piston opposite to said back conformed surface;
said back crankshaft being jointly connected to said back connecting rod opposite of said back piston; and
said back crankshaft gear being concentrically connected to said back crankshaft.

6. The horizontally opposed center fired engine as claimed in claim 1 comprises,
said cylinder and said intake block being traversed through by said left port of said intake mechanism and said right port of said intake mechanism;
said cylinder and said exhaust block being traversed through by said left port of said exhaust mechanism and said right port of said exhaust mechanism;
said left valve guide of said intake mechanism and said right valve guide of said intake mechanism being positioned within said intake block;
said left valve guide of said exhaust mechanism and said right valve guide of said exhaust mechanism being positioned within said exhaust block;
said left spring cavity of said intake mechanism and said right spring cavity of said intake mechanism traversing through said cylinder and into said intake block; and
said left spring cavity of said exhaust mechanism and said right spring cavity of said exhaust mechanism traversing through said cylinder and into said intake block.

7. The horizontally opposed center fired engine as claimed in claim 6 comprises,
said left valve and said right valve each comprise a lid, a stem, and a stop;
said lid being positioned adjacent to said stem;
said lid being concentrically connected to said stem; and
said stop being concentrically connected along said stem opposite said lid.

8. The horizontally opposed center fired engine as claimed in claim 7 comprises,
said left port being intersected by said left valve guide;
said left spring cavity being collinearly positioned to said left valve guide opposite said left port;
said left spring cavity being concentrically connected to said left valve guide;
said left valve spring being housed within said left spring cavity;
said stem of said left valve traversing through said left valve spring, said left valve guide, and said left port;
said stem of said left valve being encircled by said left valve guide;
said left port being sealed from said center space by said lid of said left valve;
said left valve spring being pressed against said stop of said left valve;
said left valve spring being pressed against said left spring cavity opposite to said stop of said left valve;
said right port being intersected by said right valve guide;
said right spring cavity being collinearly positioned to said right valve guide opposite said right port;
said right spring cavity being concentrically connected to said right valve guide;
said right valve spring being housed within said right spring cavity;
said stem of said right valve traversing through said right valve spring, said right valve guide, and said right port;
said stem of said right valve being encircled by said right valve guide;
said right port being sealed from said center space by said lid of said right valve;
said right valve spring being pressed against said stop of said right valve;
said right valve spring being pressed against said right spring cavity opposite to said stop of said right valve;
said left valve and said right valve being engaged by said camshaft;
said camshaft gear being positioned adjacent to said camshaft; and
said camshaft gear being concentrically connected to said camshaft.

9. The horizontally opposed center fired engine as claimed in claim 1 comprises,
said timing shaft being concentrically connected to said main timing gear;
said intake timing gear being engaged to said main timing gear; and
said exhaust timing gear being engaged to said main timing gear opposite to said intake timing gear.

10. The horizontally opposed center fired engine as claimed in claim 1 comprises,
said front axle gear being concentrically connected to said front shaft;
said front output being located on said front shaft opposite to said front axle gear;
said front flywheel being concentrically connected along said front shaft in between said front axle gear and said front output;
said front flywheel being positioned adjacent to said front output;
said front input gear being located in between said front flywheel and said front axle gear;
said front input gear being concentrically connected along said front shaft;
said back axle gear being concentrically connected to said back shaft;

said back output being located on said back shaft opposite to said back axle gear;

said back flywheel being concentrically connected along said back shaft in between said back axle gear and said back output;

said back flywheel being positioned adjacent to said back output;

said back input gear being located in between said back flywheel and said back axle gear;

said back input gear being concentrically connected along said back shaft;

said first side gear being engaged to said front axle gear;

said back axle gear being engaged to said first side gear opposite to said front axle gear;

said second side gear being engaged to said front axle gear opposite to said first side gear; and said back axle gear being engaged to said second side gear opposite to said front axle gear.

11. The horizontally opposed center fired engine as claimed in claim 1 comprises, said front crankshaft gear of said first internal combustion mechanism, said front crankshaft gear of said second internal combustion mechanism, said front crankshaft gear of said third internal combustion mechanism, and said front crankshaft gear of said fourth internal combustion mechanism symmetrically engaging around said front axle gear;

said back crankshaft gear of said first internal combustion mechanism, said back crankshaft gear of said second internal combustion mechanism, said back crankshaft gear of said third internal combustion mechanism, and said back crankshaft gear of said fourth internal combustion mechanism symmetrically engaging around said back axle gear;

said timing shaft of said first timing mechanism being concentrically connected to said first side gear;

said timing shaft of said second timing mechanism being concentrically connected to said second side gear;

said intake timing gear of said first timing mechanism being engaged by said camshaft gear of said intake mechanism of said first internal combustion mechanism and by said camshaft gear of said intake mechanism of said second internal combustion mechanism;

said exhaust timing gear of said first timing mechanism being engaged by said camshaft gear of said exhaust mechanism of said first internal combustion mechanism and by said camshaft gear of said exhaust mechanism of said fourth internal combustion mechanism;

said intake timing gear of said second timing mechanism being engaged by said camshaft gear of said intake mechanism of said third internal combustion mechanism and by said camshaft gear of said intake mechanism of said fourth internal combustion mechanism; and said exhaust timing gear of said second timing mechanism being engaged by said camshaft gear of said exhaust mechanism of said second internal combustion mechanism and by said camshaft gear of said exhaust mechanism of said third internal combustion mechanism.

12. A horizontally opposed center fired engine comprises,
a first internal combustion mechanism;
a second internal combustion mechanism;
a third internal combustion mechanism;
a fourth internal combustion mechanism;
a first timing mechanism;
a second timing mechanism;
a main axle;

said first internal combustion mechanism, said second internal combustion mechanism, said third internal combustion mechanism, and said fourth internal combustion mechanism each comprises a cylinder, a front piston, a front connecting rod, a front crankshaft, a front crankshaft gear, a back piston, a back connecting rod, a back crankshaft, a back crankshaft gear, a center space, a left block, a right block, an intake block, an intake mechanism, an exhaust block, an exhaust mechanism, and a plurality of assembly divisions;

said first timing mechanism and said second timing mechanism each comprises a timing shaft, a main timing gear, a intake timing gear, and an exhaust timing gear;

said main axle comprises a front shaft, a front flywheel, a front input gear, a front axle gear, a front output, a back shaft, a back flywheel, a back input gear, a back axle gear, a back output, a first side gear, and a second side gear;

said intake mechanism and said exhaust mechanism each comprises a left port, a right port, a left valve, a right valve, a left valve guide, a right valve guide, a left valve spring, a right valve spring, a left spring cavity, a right spring cavity, a camshaft, and a camshaft gear;

said main axle being located in between said first internal combustion mechanism and said third internal combustion mechanism;

said main axle being located in between said second internal combustion mechanism and said fourth internal combustion mechanism;

said first internal combustion mechanism, said second internal combustion mechanism, said third internal combustion mechanism, and said fourth internal combustion mechanism being positioned equidistant from said main axle;

said fourth internal combustion mechanism and said second internal combustion mechanism being positioned equidistant from said first internal combustion mechanism;

said first internal combustion mechanism and said third internal combustion mechanism being positioned equidistant from said second internal combustion mechanism;

said second internal combustion mechanism and said fourth internal combustion mechanism being positioned equidistant from said third internal combustion mechanism;

said third internal combustion mechanism and said first internal combustion mechanism being positioned equidistant from said fourth internal combustion mechanism;

said main axle being positioned in between said first timing mechanism and said second timing mechanism; and said first timing mechanism and said second timing mechanism being positioned equidistant from said main axle.

13. The horizontally opposed center fired engine as claimed in claim 12 comprises, said intake block and said exhaust block being centrally located within said cylinder;

said intake block and said exhaust block being diametrically opposed within said cylinder;

said left block and said right block being centrally located within said cylinder;

said left block and said right block being diametrically opposed within said cylinder;

said left block and said right block being positioned in between said intake block and said exhaust block;

said center space being formed in between said left block, said right block, said intake block, and said exhaust block;
said left block comprises a left spark plug and a left direct fuel injection device;
said right block comprises a right spark plug and a right direct fuel injection device;
said left spark plug being positioned adjacent to said left direct fuel injection device;
said left spark plug and said left direct fuel injection device protruding into said center space;
said right spark plug being positioned adjacent to said right direct fuel injection device;
said right spark plug and said right direct fuel injection device protruding into said center space;
said left spark plug being positioned opposite said right direct fuel injection device;
said right spark plug being positioned opposite said left direct fuel injection device;
said front piston and said back piston being encircled by said cylinder;
said front piston being positioned opposite to said back piston within said cylinder;
said front piston having a front conformed surface;
said front connecting rod being jointly connected to said front piston opposite to said front conformed surface;
said front crankshaft being jointly connected to said front connecting rod opposite of said front piston;
said front crankshaft gear being concentrically connected to said front crankshaft;
said back piston having a back conformed surface;
said back connecting rod being jointly connected to said back piston opposite to said back conformed surface;
said back crankshaft being jointly connected to said back connecting rod opposite of said back piston; and
said back crankshaft gear being concentrically connected to said back crankshaft.

14. The horizontally opposed center fired engine as claimed in claim 12 comprises,
said cylinder and said intake block being traversed through by said left port of said intake mechanism and said right port of said intake mechanism;
said cylinder and said exhaust block being traversed through by said left port of said exhaust mechanism and said right port of said exhaust mechanism;
said left valve guide of said intake mechanism and said right valve guide of said intake mechanism being positioned within said intake block;
said left valve guide of said exhaust mechanism and said right valve guide of said exhaust mechanism being positioned within said exhaust block;
said left spring cavity of said intake mechanism and said right spring cavity of said intake mechanism traversing through said cylinder and into said intake block;
said left spring cavity of said exhaust mechanism and said right spring cavity of said exhaust mechanism traversing through said cylinder and into said intake block;
said left valve and said right valve each comprise a lid, a stem, and a stop;
said lid being positioned adjacent to said stem;
said lid being concentrically connected to said stem;
said stop being concentrically connected along said stem opposite said lid;
said left port being intersected by said left valve guide;
said left spring cavity being collinearly positioned to said left valve guide opposite said left port;
said left spring cavity being concentrically connected to said left valve guide;
said left valve spring being housed within said left spring cavity;
said stem of said left valve traversing through said left valve spring, said left valve guide, and said left port;
said stem of said left valve being encircled by said left valve guide;
said left port being sealed from said center space by said lid of said left valve;
said left valve spring being pressed against said stop of said left valve;
said left valve spring being pressed against said left spring cavity opposite to said stop of said left valve;
said right port being intersected by said right valve guide;
said right spring cavity being collinearly positioned to said right valve guide opposite said right port;
said right spring cavity being concentrically connected to said right valve guide;
said right valve spring being housed within said right spring cavity;
said stem of said right valve traversing through said right valve spring, said right valve guide, and said right port;
said stem of said right valve being encircled by said right valve guide;
said right port being sealed from said center space by said lid of said right valve;
said right valve spring being pressed against said stop of said right valve;
said right valve spring being pressed against said right spring cavity opposite to said stop of said right valve;
said left valve and said right valve being engaged by said camshaft;
said camshaft gear being positioned adjacent to said camshaft; and
said camshaft gear being concentrically connected to said camshaft.

15. The horizontally opposed center fired engine as claimed in claim 12 comprises,
said timing shaft being concentrically connected to said main timing gear;
said intake timing gear being engaged to said main timing gear;
said exhaust timing gear being engaged to said main timing gear opposite to said intake timing gear;
said front axle gear being concentrically connected to said front shaft;
said front output being located on said front shaft opposite to said front axle gear;
said front flywheel being concentrically connected along said front shaft in between said front axle gear and said front output;
said front flywheel being positioned adjacent to said front output;
said front input gear being located in between said front flywheel and said front axle gear;
said front input gear being concentrically connected along said front shaft;
said back axle gear being concentrically connected to said back shaft;
said back output being located on said back shaft opposite to said back axle gear;
said back flywheel being concentrically connected along said back shaft in between said back axle gear and said back output;
said back flywheel being positioned adjacent to said back output;

said back input gear being located in between said back flywheel and said back axle gear;

said back input gear being concentrically connected along said back shaft;

said first side gear being engaged to said front axle gear;

said back axle gear being engaged to said first side gear opposite to said front axle gear;

said second side gear being engaged to said front axle gear opposite to said first side gear; and said back axle gear being engaged to said second side gear opposite to said front axle gear.

16. The horizontally opposed center fired engine as claimed in claim 12 comprises, said front crankshaft gear of said first internal combustion mechanism, said front crankshaft gear of said second internal combustion mechanism, said front crankshaft gear of said third internal combustion mechanism, and said front crankshaft gear of said fourth internal combustion mechanism symmetrically engaging around said front axle gear;

said back crankshaft gear of said first internal combustion mechanism, said back crankshaft gear of said second internal combustion mechanism, said back crankshaft gear of said third internal combustion mechanism, and said back crankshaft gear of said fourth internal combustion mechanism symmetrically engaging around said back axle gear;

said timing shaft of said first timing mechanism being concentrically connected to said first side gear;

said timing shaft of said second timing mechanism being concentrically connected to said second side gear;

said intake timing gear of said first timing mechanism being engaged by said camshaft gear of said intake mechanism of said first internal combustion mechanism and by said camshaft gear of said intake mechanism of said second internal combustion mechanism;

said exhaust timing gear of said first timing mechanism being engaged by said camshaft gear of said exhaust mechanism of said first internal combustion mechanism and by said camshaft gear of said exhaust mechanism of said fourth internal combustion mechanism;

said intake timing gear of said second timing mechanism being engaged by said camshaft gear of said intake mechanism of said third internal combustion mechanism and by said camshaft gear of said intake mechanism of said fourth internal combustion mechanism; and said exhaust timing gear of said second timing mechanism being engaged by said camshaft gear of said exhaust mechanism of said second internal combustion mechanism and by said camshaft gear of said exhaust mechanism of said third internal combustion mechanism.

17. A horizontally opposed center fired engine comprises,
a first internal combustion mechanism;
a second internal combustion mechanism;
a third internal combustion mechanism;
a fourth internal combustion mechanism;
a first timing mechanism;
a second timing mechanism;
a main axle;
said first internal combustion mechanism, said second internal combustion mechanism, said third internal combustion mechanism, and said fourth internal combustion mechanism each comprises a cylinder, a front piston, a front connecting rod, a front crankshaft, a front crankshaft gear, a back piston, a back connecting rod, a back crankshaft, a back crankshaft gear, a center space, a left block, a right block, an intake block, an intake mechanism, an exhaust block, an exhaust mechanism, and a plurality of assembly divisions;

said first timing mechanism and said second timing mechanism each comprises a timing shaft, a main timing gear, a intake timing gear, and an exhaust timing gear;

said main axle comprises a front shaft, a front flywheel, a front input gear, a front axle gear, a front output, a back shaft, a back flywheel, a back input gear, a back axle gear, a back output, a first side gear, and a second side gear;

said intake mechanism and said exhaust mechanism each comprises a left port, a right port, a left valve, a right valve, a left valve guide, a right valve guide, a left valve spring, a right valve spring, a left spring cavity, a right spring cavity, a camshaft, and a camshaft gear;

said main axle being located in between said first internal combustion mechanism and said third internal combustion mechanism;

said main axle being located in between said second internal combustion mechanism and said fourth internal combustion mechanism;

said first internal combustion mechanism, said second internal combustion mechanism, said third internal combustion mechanism, and said fourth internal combustion mechanism being positioned equidistant from said main axle;

said fourth internal combustion mechanism and said second internal combustion mechanism being positioned equidistant from said first internal combustion mechanism;

said first internal combustion mechanism and said third internal combustion mechanism being positioned equidistant from said second internal combustion mechanism;

said second internal combustion mechanism and said fourth internal combustion mechanism being positioned equidistant from said third internal combustion mechanism;

said third internal combustion mechanism and said first internal combustion mechanism being positioned equidistant from said fourth internal combustion mechanism;

said main axle being positioned in between said first timing mechanism and said second timing mechanism;

said first timing mechanism and said second timing mechanism being positioned equidistant from said main axle;

said front piston and said back piston being encircled by said cylinder;

said front piston being positioned opposite to said back piston within said cylinder;

said front piston having a front conformed surface;

said front connecting rod being jointly connected to said front piston opposite to said front conformed surface;

said front crankshaft being jointly connected to said front connecting rod opposite of said front piston;

said front crankshaft gear being concentrically connected to said front crankshaft;

said back piston having a back conformed surface;

said back connecting rod being jointly connected to said back piston opposite to said back conformed surface;

said back crankshaft being jointly connected to said back connecting rod opposite of said back piston;

said back crankshaft gear being concentrically connected to said back crankshaft;

said cylinder and said intake block being traversed through by said left port of said intake mechanism and said right port of said intake mechanism;

said cylinder and said exhaust block being traversed through by said left port of said exhaust mechanism and said right port of said exhaust mechanism;
said left valve guide of said intake mechanism and said right valve guide of said intake mechanism being positioned within said intake block;
said left valve guide of said exhaust mechanism and said right valve guide of said exhaust mechanism being positioned within said exhaust block;
said left spring cavity of said intake mechanism and said right spring cavity of said intake mechanism traversing through said cylinder and into said intake block; and
said left spring cavity of said exhaust mechanism and said right spring cavity of said exhaust mechanism traversing through said cylinder and into said intake block.

18. The horizontally opposed center fired engine as claimed in claim 17 comprises,
said intake block and said exhaust block being centrally located within said cylinder;
said intake block and said exhaust block being diametrically opposed within said cylinder;
said left block and said right block being centrally located within said cylinder;
said left block and said right block being diametrically opposed within said cylinder;
said left block and said right block being positioned in between said intake block and said exhaust block;
said center space being formed in between said left block, said right block, said intake block, and said exhaust block;
said left block comprises a left spark plug and a left direct fuel injection device;
said right block comprises a right spark plug and a right direct fuel injection device;
said left spark plug being positioned adjacent to said left direct fuel injection device;
said left spark plug and said left direct fuel injection device protruding into said center space;
said right spark plug being positioned adjacent to said right direct fuel injection device;
said right spark plug and said right direct fuel injection device protruding into said center space;
said left spark plug being positioned opposite said right direct fuel injection device; and
said right spark plug being positioned opposite said left direct fuel injection device.

19. The horizontally opposed center fired engine as claimed in claim 17 comprises,
said left valve and said right valve each comprise a lid, a stem, and a stop;
said lid being positioned adjacent to said stem;
said lid being concentrically connected to said stem;
said stop being concentrically connected along said stem opposite said lid;
said left port being intersected by said left valve guide;
said left spring cavity being collinearly positioned to said left valve guide opposite said left port;
said left spring cavity being concentrically connected to said left valve guide;
said left valve spring being housed within said left spring cavity;
said stem of said left valve traversing through said left valve spring, said left valve guide, and said left port;
said stem of said left valve being encircled by said left valve guide;
said left port being sealed from said center space by said lid of said left valve;
said left valve spring being pressed against said stop of said left valve;
said left valve spring being pressed against said left spring cavity opposite to said stop of said left valve;
said right port being intersected by said right valve guide;
said right spring cavity being collinearly positioned to said right valve guide opposite said right port;
said right spring cavity being concentrically connected to said right valve guide;
said right valve spring being housed within said right spring cavity;
said stem of said right valve traversing through said right valve spring, said right valve guide, and said right port;
said stem of said right valve being encircled by said right valve guide;
said right port being sealed from said center space by said lid of said right valve;
said right valve spring being pressed against said stop of said right valve;
said right valve spring being pressed against said right spring cavity opposite to said stop of said right valve;
said left valve and said right valve being engaged by said camshaft;
said camshaft gear being positioned adjacent to said camshaft; and
said camshaft gear being concentrically connected to said camshaft.

20. The horizontally opposed center fired engine as claimed in claim 17 comprises,
said timing shaft being concentrically connected to said main timing gear;
said intake timing gear being engaged to said main timing gear;
said exhaust timing gear being engaged to said main timing gear opposite to said intake timing gear;
said front axle gear being concentrically connected to said front shaft;
said front output being located on said front shaft opposite to said front axle gear;
said front flywheel being concentrically connected along said front shaft in between said front axle gear and said front output;
said front flywheel being positioned adjacent to said front output;
said front input gear being located in between said front flywheel and said front axle gear;
said front input gear being concentrically connected along said front shaft;
said back axle gear being concentrically connected to said back shaft;
said back output being located on said back shaft opposite to said back axle gear;
said back flywheel being concentrically connected along said back shaft in between said back axle gear and said back output;
said back flywheel being positioned adjacent to said back output;
said back input gear being located in between said back flywheel and said back axle gear;
said back input gear being concentrically connected along said back shaft;
said first side gear being engaged to said front axle gear;
said back axle gear being engaged to said first side gear opposite to said front axle gear;
said second side gear being engaged to said front axle gear opposite to said first side gear;

said back axle gear being engaged to said second side gear opposite to said front axle gear;

said front crankshaft gear of said first internal combustion mechanism, said front crankshaft gear of said second internal combustion mechanism, said front crankshaft gear of said third internal combustion mechanism, and said front crankshaft gear of said fourth internal combustion mechanism symmetrically engaging around said front axle gear;

said back crankshaft gear of said first internal combustion mechanism, said back crankshaft gear of said second internal combustion mechanism, said back crankshaft gear of said third internal combustion mechanism, and said back crankshaft gear of said fourth internal combustion mechanism symmetrically engaging around said back axle gear;

said timing shaft of said first timing mechanism being concentrically connected to said first side gear;

said timing shaft of said second timing mechanism being concentrically connected to said second side gear;

said intake timing gear of said first timing mechanism being engaged by said camshaft gear of said intake mechanism of said first internal combustion mechanism and by said camshaft gear of said intake mechanism of said second internal combustion mechanism;

said exhaust timing gear of said first timing mechanism being engaged by said camshaft gear of said exhaust mechanism of said first internal combustion mechanism and by said camshaft gear of said exhaust mechanism of said fourth internal combustion mechanism;

said intake timing gear of said second timing mechanism being engaged by said camshaft gear of said intake mechanism of said third internal combustion mechanism and by said camshaft gear of said intake mechanism of said fourth internal combustion mechanism; and said exhaust timing gear of said second timing mechanism being engaged by said camshaft gear of said exhaust mechanism of said second internal combustion mechanism and by said camshaft gear of said exhaust mechanism of said third internal combustion mechanism.

\* \* \* \* \*